United States Patent [19]
Hallden-Abberton et al.

[11] Patent Number: 4,727,117
[45] Date of Patent: Feb. 23, 1988

[54] IMIDE POLYMERS

[75] Inventors: Michael P. Hallden-Abberton, Maple Glen; Newman M. Bortnick, Oreland; Leslie A. Cohen, Langhorne, all of Pa.; William T. Freed, Stockton, N.J.; Harry C. Fromuth, Trevose, Pa.

[73] Assignee: Rohm and Haas Company, Philadelphia, Pa.

[21] Appl. No.: 770,034

[22] Filed: Aug. 27, 1985

[51] Int. Cl.$^4$ ................................. C08F 8/32
[52] U.S. Cl. ..................... 525/343; 525/327.4; 525/327.6; 525/327.7; 525/329.5; 525/329.6; 525/343; 525/384; 525/385; 525/386
[58] Field of Search ................ 525/383, 384, 386, 343

[56] References Cited
U.S. PATENT DOCUMENTS

| | | | |
|---|---|---|---|
| 3,284,425 | 11/1966 | Schröder et al. | 525/378 |
| 3,583,948 | 6/1971 | Blechinger | 525/327.6 |
| 3,639,357 | 2/1972 | Cohen | 525/327.6 |
| 4,129,619 | 12/1978 | Fava | 525/327.6 |
| 4,157,431 | 6/1979 | Fields et al. | 525/327.6 |
| 4,246,374 | 1/1981 | Kopchik | 525/379 |
| 4,423,194 | 12/1983 | Löbach et al. | 525/327.6 |

Primary Examiner—Joseph L. Schofer
Assistant Examiner—Bernard Lipman
Attorney, Agent, or Firm—John E. Taylor, III

[57] ABSTRACT

Glutarimide polymers having an acid and anhydride content lower than the acid and/or anhydride content normally present in the glutarimide polymers. Blends of the reduced acid and anhydride glutarimide polymers with thermoplastic materials are disclosed. A process for altering the properties oif imide polymers by reducing or substantially removing acid and anhydride levels normally present in the imide polymer is also disclosed.

22 Claims, No Drawings

IMIDE POLYMERS

BACKGROUND OF THE INVENTION

This invention relates to imide polymers having acid and anhydride levels less than are normally present in such polymers. This invention also relates to blends of the imide polymers, having lower than normal acid and anhydride levels, with other thermoplastic materials. The invention further contemplates a process for altering the properties of imide polymers by reducing or substantially eliminating acid and anhydride functionality on the imide polymer.

U.S. Pat. No. 4,246,374 describes and claims polyglutarimide polymers and their preparation. The U.S. Pat. No. 4,246,374 teaches that the degree of imidization of an acrylic polymer may vary from as low as 1% imidization to about 100% imidization. The U.S. Pat. No. 4,246,374 teaches that imidization is accomplished with anhydrous ammonia or an anhydrous primary amine.

U.S. Pat. No. 3,284,425 is directed to the preparation of polymethacrylimide products. The U.S. Pat. No. 3,284,425 discusses the possibility that acid or ester groups may become isolated between adjacent imide rings. The U.S. Pat. No. 3,284,425 also teaches the formation of polymethacrylimide products which "... are substantially free of carboxy or ester groups . . . in which the degree of imidization is at least about 95% . . . " Thus, the U.S. Pat. No. 3,284,425 reference, while recognizing the presence of acid groups in the polyimides, teaches imidizing to at least about 95% imidization in order to lower or remove the acid functionality of a polymethacrylimide.

Further, there is no recognition in the U.S. Pat. No. 3,284,425 concerning adverse effects of the normal amount of acid and anhydride functionality on a polyimide polymer.

U.S. Pat. No. 4,518,717 describes a process for making imide polymers by reacting a monomeric dianhydride with a lactam or oxime to form a bis-imide having an acid-group-carrying radical attached to the imide nitrogen. The bis-imide monomer is then esterified with a reactive solvent that acts as an esterifying agent; methanol is typical. In the esterification process, the aromatic imide functionality is retained. The esterified bis-imide monomer is subsequently reacted with an aromatic diamine monomer in a polycondensation reaction, to form an imide or amide-imide polymer.

European Patent Publication No. 007669, published Apr. 13, 1983, describes the preparation of polyimides which are free from methyl substitution on the nitrogen atom. The European publication teaches the preparation of imide polymers free from methyl substitution on the nitrogen atom starting from a non-crosslinked polymer which contains glutaric anhydride units. The polyglutaric anhydrides are reacted with ammonia to yield the desired polyimides free from methyl substitution on the nitrogen atom. As the degree of imidization exceeds 95% and approaches complete imidization, the amount of residual acid and anhydride units remaining in the polymer chain becomes less significant, although the degree of imidization, if above 95%, is a factor which limits the utility of the resultant polyimide. When the degree of imidization is less than 95%, then the residual acid and anhydride functionality on the polymer chain results in less desirable properties than could be obtained when the acid and anhydride functionality is reduced or eliminated.

*Makromol. Chem.*, 184, pages 1705–1726 (1983) discloses an analytical technique for confirming the chemical structure of the reaction products of polymethacrylic acid and formamide. The technique encompasses treating copolymers of methacrylic acid and methacrylimide with diazomethane. There is no disclosure in the reference procedure concerning the degree of imidization. Further, the imide groups are reacted along with the acid groups.

Japanese patent application No. 128,195, published Feb. 2, 1985, describes a process for preparing a polyglutarimide by condensing a polyamide or a copolymer of a methacrylamide with a methacrylate ester.

U.S. Pat. No. 4,458,046 discloses blends of vinyl chloride polymers and copolymers of the styrene-maleimide type. The U.S. Pat. No. 4,458,046 teaches that the imide used be prepared from a dicarboxylic acid moiety and that complete conversion of the dicarboxylic acid moiety to the desired imide be obtained by using an excess of the stoichiometric amount of ammonia or amine required for such conversion.

As a by-product of imidization of (meth)acrylic polymers by reaction with ammonia or primary amines, anhydride and acid groups are formed on the polymer chain. The acid and anhydride groups are intermediate in the formation of imide units. When the degree of imidization exceeds 95% and approaches 100%, the amount of acid and anhydride units present on the resultant imide product decreases and poses less of a problem. However, when the degree of imidization exceeds 95%, particularly when an autoclave process is used, then a high degree of discoloration of the resultant polymer and degradation of the polymer itself is often obtained. The degradation of the polymer may also lead to alteration of the desirable properties of the resultant imide polymer.

When the degree of imidization of a polymer is 95% or less, then the amount of acid and anhydride functionality normally present on the polymer chain as a natural incidence of the reaction involved becomes objectionable in that the presence of acid and anhydride functionality generally adversely affects the properties of the polyimide. For example, the presence of the normal amount of acid and anhydride functionality on an imide or polyglutarimide polymer will alter the miscibility of such polymer with other thermoplastic polymers. Additionally, acid and anhydride functionality affects the weatherability of a molded article prepared from such polymer in that the molded article will absorb more water as a result of the presence of the normal amount of acid and anhydride functionality. Further, high acid and anhydride functionality can result in higher melt viscosity which would translate into the polymer being more difficult to process into various molded articles.

It is an object of this invention therefore, to prepare a polyimide wherein the amount of acid and anhydride functionality is reduced from the amount normally present, or is substantially eliminated.

A further object of this invention is to prepare blends of polyimides with other thermoplastic polymers wherein the acid and anhydride functionality of the polyimide in the blend has either been reduced from that which was originally present or has been substantially eliminated.

A still further object is to provide a process for reducing or substantially eliminating acid and anhydride functionality existing on a polyimide.

Other objects and advantages will become more apparent from the following more complete description and claims.

DETAILED DESCRIPTION

Broadly, this invention contemplates a polymer containing glutarimide units wherein the degree of imidization, by weight, on said polymer, and the acid and anhydride functionality on said polymer, expressed in milliequivalents per gram of imidizable components in said polymer, are as set forth below;

| when the degree of imidization on said polymer is | the milliequivalents of acid and anhydride per gram are |
| --- | --- |
| from about 1% to about 10% | 0 to about 0.20 |
| above about 10% to about 20% | 0 to about 0.28 |
| above about 20% to about 30% | 0 to about 0.32 |
| above about 30% to about 40% | 0 to about 0.31 |
| above about 40% to about 50% | 0 to about 0.28 |
| above about 50% to about 60% | 0 to about 0.28 |
| above about 60% to about 70% | 0 to about 0.27 |
| above about 70% to about 80% | 0 to about 0.28 |
| above about 80% to about 90% | 0 to about 0.33 |
| and above about 90% to about 95% | 0 to about 0.40 |

This invention also contemplates a blend of at least one thermoplastic polymer and a second polymer, said second polymer being a polyimide polymer as described in the immediately preceding paragraph.

This invention further contemplates a process for altering the properties of a polymer containing imide units wherein the degree of imidization is at least 1% and containing residual acidic or anhydride groups comprising reacting said residual groups with an agent capable of blocking the functionality of said groups.

It was surprising to find that when acid and anhydride functionality of a polyimide was reduced or substantially eliminated, the resultant polyimide then exhibited altered miscibility and compatibility with other thermoplastic polymers, better weatherability characteristics, and a lower melt viscosity thereby enhancing the processability of the polyimide. The polyimide having reduced or substantially eliminated acid and anhydride functionality when compared to a polyimide which has the amount of acid and anhydride functionality normally present, is a superior product.

The polyimides of the present invention also possess superior thermal stability. Preferred polyimides of this invention are those which have a thermal stability indicated by a 1% weight loss, by thermogravimetric analysis (TGA), at a temperature above 285° C. in air and above 300° C. in nitrogen.

As used in the specification and claims, the term "degree of imidization" refers to the weight percentage of imide groups on a polymer in relation to the groups of the polymer capable of being reacted to form imide groups. For example, one may have a copolymer of styrene and methacrylic acid. Because the styrene is not capable of being imidized, the degree of imidization is based on the percentage of imide groups which are subsequently formed from the methacrylic acid portion of the copolymer.

Any thermoplastic polyimide, containing acid and/or anhydride groups, may be used in practicing the process of this invention. For example, one may use the polyglutarimides disclosed in U.S. Pat. No. 4,246,374. The disclosure of U.S. Pat. No. 4,246,374 is incorporated herein by reference. Additionally, one may use a polymethacrylimide of the type set forth in U.S. Pat. No. 3,284,425. The polyglutarimide product of this invention may be prepared from a polyimide such as those derived from esters of acrylic or methacrylic acid wherein the ester moiety contains from about 1 to about 20 carbon atoms and which has been reacted with ammonia or a primary amine wherein the hydrocarbon portion of the amine is hydrogen or a substituted or unsubstituted alkyl or aryl group having up to about 20 carbon atoms, may also be used. Such polyimides are disclosed in U.S. Pat. No. 4,246,374. A preferred polyimide is derived from methyl methacrylate.

The composition of the polyimide may be varied depending upon the properties desired from the final product. A preferred polyimide contains up to about 50%, and preferably from about 10% to about 50%, by weight, of acrylic or methacrylic ester units, preferably wherein the ester moiety contains from 1 to about 20 carbon atoms. Another preferred polyimide contains from about 50 to about 99%, by weight, of acrylic or methacrylic ester units, with the preferred ester moiety as stated above. Among the ester moieties, a more preferred one is methyl.

Among the polyimides which may be used to practice the process of this invention are the polyglutarimides described above and copolymers thereof with, for example, styrenic materials such as styrene, ring substituted styrenes, alpha-methyl styrene and the like, all optionally containing acrylonitrile, or methacrylonitrile and the like; polyimides containing succinimide functionality such as those prepared by the copolymerization of an alkyl methacrylate with a maleimide or N-alkylmaleimides or N-arylmaleimide and the like; polyimides prepared by the copolymerization of alkyl methacrylates, maleimide and/or N-alkyl and/or N-arylmaleimides, styrene and/or ring substituted styrenes or alpha-methylstyrene, all optionally containing acrylonitrile or methacrylonitrile, and the like; copolymers of styrene, ring substituted styrenes, or alpha-methylstyrene with maleimide or N-alkylmaleimides, or N-arylmaleimides, and the like; copolymers of ethylene and propylene containing glutarimide functionality, and the like; graft polymers of methyl methacrylate or methacrylic acid onto polyethylene, polypropylene, or ethylenepropylene diene rubber, and the like; copolymers of maleic anhydride and olefins, followed by imidization, and graft copolymers of maleic anhydride onto polyolefins followed by imidization, and the like; and copolymers of alkylmethacrylate, styrene, itaconimide, citraconimide, alpha-methylmaleimide or N-methyl alpha-methylmaleimide, all optionally with acrylonitrile, and the like. Whichever polyimide is used to practice the process of this invention, such polyimide must have residual acid and/or anhydride groups.

Particularly preferred polyimides are those set forth in U.S. Pat. No. 4,246,374 and, even more particularly preferred, are the polyglutarimides prepared by the reaction of (1) poly(methyl methacrylate) with ammonia or methylamine and (2) a copolymer of poly(methyl methacrylate) and ethyl acrylate with ammonia or methylamine and (3) a copolymer of (methyl)styrene and methyl methacrylate with ammonia or methylamine, because these polyimides are simple to prepare and easy to work with.

The polyimides may be prepared in any suitable manner and the invention is not to be construed as being limited to the method of preparation of the polyimide. For example, one may prepare a polyimide by heating, with stirring, the selected polymer such as poly(methyl methacrylate), in an autoclave, in the presence of a primary amine, such as butylamine or methylamine. Other suitable amines include aniline and cyclohexylamine; ammonia is also suitable for preparing the polyimide. The reaction may be conducted in the presence of water and at an elevated pressure such as between about 8 and about 85 atmospheres. The temperature which may be used may vary from about 180° C. to about 350° C., with the understanding that the pressure used will vary with the temperature used.

One may also prepare a polyimide as described in U.S. Pat. No. 4,246,374 wherein an extruder is used in the preparation. Generally, when using an extruder, the polymer, such as poly(methacrylic acid) may be continuously fed to an extruder and ammonia or a primary amine, such as methylamine, may be introduced continuously through an injection port. Unwanted by-products and excess ammonia or primary amine are removed by progressively reducing the pressure at downstream extruder vents. The temperature in the extruder may be varied and such variation will be dependent on the nature of the starting materials, pressure being used, residence time, melt viscosity of the polymer being extruded, etc. Generally, a temperature of from about 200° C. to about 450° C. may be used in preparing the polyimide and a pressure may be used which is from about atmospheric to about 1000 atmospheres, although pressures of less than 500 atmospheres are generally suitable. The reaction time of the acrylic polymer in the reaction zone of the extruder will generally vary from about 0.1 to about 1000 seconds and preferably from about 30 to about 300 seconds. The desired degree of imidization is obtained by suitable adjustment of various reaction parameters such as residence time. The extruder is generally equipped with a screw which advances the materials present through the extruder. In a particularly preferred embodiment, the extruder may be equipped with at least one pair of screws. The number of pairs of screws which is present in the extruder is dictated solely by economic and practical process conditions. In one embodiment, each screw member of each pair of screws which is present in the extruder may rotate in a direction counter to the rotational direction of the other screw member of the pair. In this manner mixing may be enhanced, as may removal of undesired materials.

The polyimide may also be prepared in a tubular reaction vessel such as a baffled in-line mixer, wherein the baffles provide the necessary mixing. The baffled in-line mixer may also be equipped with various ports for the introduction of necessary reactants or materials.

It is preferred that an extruder be used and that the extruder which is used for preparing the polyimide, be equipped with at least one pair of screws wherein each member of the pair rotates in a direction counter to the rotational direction of the other screw member of the pair.

Because the preparation of the polyimide may involve amide and/or acid intermediates which may give rise to imides or anhydrides, if an extruder apparatus is not used to prepare the polyimide, the final product may contain imide, amide, acid, anhydride and ester moieties. The preference for the reaction to take place in the extruder is for the reason that the proper use of the extruder tends to cause all significant amide groups to further react to imide although some acid and anhydride groups are still present. Thus, polyimides prepared using an extruder are usually substantially free of amide functionality and contain less acid and anhydride functionality than polyimides prepared using other processes.

The invention is not to be construed as limited to any particular method for preparing polyimides.

Regardless of which apparatus or method is used for preparing the polyimides, the degree of imidization should be controlled so that the final product has from about 10% to no more than about a 95% degree of imidization. It is preferred however that the degree of imidization of the polyimide be from about 25% to about 95%, more preferred that the degree of imidization be from about 40% to about 88%, and still more preferred that the degree of imidization be from about 50% to about 85%.

In a preferred embodiment of the present invention, the acid and anhydride functionality of polyimide having up to about 88% degree of imidization is reduced to about 0.25 or fewer milliequivalents per gram of imidizable polymer component, and in a more preferred embodiment the acid and anhydride functionality of a polyimide having up to about 85% degree of imidization is reduced to about 0.25 or fewer milliequivalents per gram of imidizable polymer component.

If the degree of imidization exceeds 95%, then, although the acid and anhydride level of such a polyimide may be low, such polyimides may suffer from a high degree of discoloration, a partially degraded polymer, and undesirable alteration of the properties of the polyimide.

Although the final polyimide product of this invention has no more than about a 95% degree of imidization, the process of this invention may be used to remove acid and anhydride functionality from a polyimide containing such functionality wherein the degree of imidization of such polyimide exceeds 95% and is less than 100%.

The agent which is used to remove or reduce the acid and anhydride functionality may be any agent which is capable of reacting with the acid and anhydride groups and incapable of reacting with the imide functionality and which will not adversely affect the properties of the polyimide, either during the time the reaction with the acid and anhydride functionality is being conducted or in the final polymer.

The term acid and anhydride functionality, as used in the specification and claims, means any carboxylic acid, carboxylic acid salt, and/or anhydride group present on the polyimide.

Among the types of agents which may be used to partially or completely remove acid and anhydride groups which are present on the polyimide are alkylating agents such as orthoesters, ketals, carbonates, sulfoxides and the like. Other agents, including esterification agents, may also be used such as siloxanes, silyl ethers, silylenol ethers, trialkyl phosphates, trialkyl phosphites, dialkyl sulfates, alkyl alkylsulfonates, alkyl arylsulfonates, dialkyl carbonates, diaryl carbonates, aryl isocyanates, carbodiimides, trialkylsilyl halides, enol esters, alcohols, alkyl esters, alkyl isocyanates, quaternary ammonium salts, ureas, guanidines, and the like.

Among the specific agents which may be used to remove acid and anhydride functionality are dimethyl carbonate, 2,2-dimethoxypropane, dimethyl sulfoxide, triethyl orthoformate, trimethyl orthoacetate, trimethyl orthoformate, diphenyl carbonate, dimethyl sulfate, methyl toluenesulfonate, methyl trifluoromethylsulfonate, methyl acetate, methanol, ethanol, methyl isocyanate, p-chlorophenyl isocyanate, dimethyl carbodiimide, dimethyl t-butylsilyl chloride, isopropenyl acetate, dimethyl urea, tetramethylammonium hydroxide, dimethyl diethoxysilane, tetra-n-butoxysilane, dimethyl(trimethylsilyl)phosphite, trimethyl phosphite, trimethyl phosphate, tricresyl phosphate, and the like.

The amount of agent used to remove acid and anhydride functionality will vary depending upon the amount of acid and anhydride present. This may be readily determined by the titration method described hereafter. The amount of agent used will generally be at least the stoichiometric amount of agent needed to remove the acid and anhydride functionality if it is desired to remove substantially all acid and anhydride functionality. Generally, when removing all acid and anhydride functionality from the polyimide, it is desirable to use from about a 10% to about a 50% excess above stoichiometry of the agent.

When it is desired to remove only a portion of the acid and anhydride functionality, then it is preferred to use less than a stoichiometric amount of agent to avoid removing more acid and anhydride functionality than is desired.

In some instances, the agent used may react with water which is associated with the polyimide. In such instances, procedures may be used to assure that the desired amount of agent is present to react with the acid and anhydride groups present on the polyimide. One procedure is to dry the polyimide, for example, under vacuum at a temperature of from about 100° C. to about 135° C. for about 8 to about 20 hours. A second procedure is to use an excess, above the amount of agent required, so that the excess amount of agent will react with the water present and the desired amount of agent will react with the acid and anhydride groups present on the polyimide.

The reaction wherein the acid and anhydride functionality is removed or reduced may be conducted in a single or multi-screw extruder, in an autoclave, in a continuously recirculated pipe reactor, in a baffled in-line mixer which may be used in series with an extruder, in a wiping-film evaporator, a falling film reactor or evaporator, in a disc extruder or reactor, or other melt-mixing device or the like.

If the reaction is conducted using an extruder, then it may be conducted as a continuous process wherein a polyimide is prepared in an extruder and is then passed, in the extruder, into a zone wherein the agent is introduced and the polyimide is contacted with the agent for a period of time of from about 15 seconds to about 20 minutes at a temperature of from about 150° C. to about 400° C. and at a pressure of from about atmospheric to about 15000 kiloPascals (2200 psi), in the absence of any solvent and/or catalyst.

Alternatively, a polyimide, which has been previously prepared, may be introduced into an extruder at an elevated temperature so as to form a molten mass, and may then be contacted with the agent at the aforesaid temperature and pressure.

If the reaction of the agent and the acid and anhydride groups is to be conducted in an autoclave, then the reaction may take place, with or without a solvent for the polyimide, in the autoclave for a period of time of from about 10 minutes to about 8 hours at temperatures of from about 100° C. to about 180° C. and in an unpressurized vessel or a pressurized vessel at pressures to about 1000 atmospheres. In some instances, the agent, if a liquid, may also act as the solvent for the polyimide. In other instances a separate solvent may be used.

The solvent used may vary widely depending on the nature of the polyimide solute to be reacted. Generally, the solvent should be at least somewhat polar in nature and should be non-reactive with the agent to be used. If the agent is not to also act as the solvent for the polyimide then the solvent should also be non-reactive with the polyimide.

Among the solvents which may be used are diglyme, triglyme, sulfolane, tetrahydrofuran, tetrahydropyran and the like.

Yet another method for conducting the reaction of the polyimide with the agent is to melt the polyimide in the autoclave and to conduct the reaction between the acid and anhydride groups of the polyimide and the agent in a molten state without the addition of any solvent.

Still another method is to prepare the polyimide in a reaction vessel, such as an autoclave, and, as the very last step in the preparation, to add a suitable agent for the removal of the acid and anhydride groups.

If one is to conduct a continuous reaction to prepare a polyimide and remove or reduce acid and anhydride functionality, whether in an extruder, autoclave or other reaction vessel, then the amount of acid and anhydride groups present on the polyimide may be determined by first conducting the imidization reaction under the conditions to be used in the extruder, autoclave or other reaction vessel and measuring the amount of acid and anhydride groups present on the resultant polyimide. In this manner, one may predetermine the amount of agent to be added, if a continuous process is to be utilized, to remove the desired amount of acid and anhydride groups. In some cases by-products or unreacted materials from the imidization reaction may enhance or impede the subsequent reaction of the polyimide with the agent.

If desired, the reaction of the agent with the polyimide may be conducted in the presence of a catalyst. The catalyst preferably catalyzes the reaction of the agent with the polyimide, but does not catalyze degradation of the polyimide nor cause other undesirable reactions. Among the catalysts which may be used are base catalysts such as trimethylamine, triethylamine, benzyldimethylamine, tetramethylammonium hydroxide and the like. One may also use acid catalysts or Lewis acid catalysts such as p-toluenesulfonic acid, tetrabutyl titanate, manganese tetracetate and the like.

Optionally, the polyimide may be the final stage in a multistage polymer and the reaction is conducted with the entire multistage polymer. Further, the polyimide may be one of the elements of a block or graft copolymer, and the reaction is conducted in the presence of the entire block or graft copolymer.

In another embodiment, the polyimide may be in the core of a multistage polymer or in the second or other intermediate stage of a multistage polymer and the acid and anhydride functionality may be removed as aforesaid. The amount of acid and anhydride functionality on any of the polyimides of the stages of the multi-stage polymer may be adjusted to that which is desired.

The polyimides of this invention may be blended with one or more other thermoplastic polymers and may even be blended with another polyimide which may or may not have had its acid and anhydride level reduced or substantially eliminated. The polyimide according to this invention may be blended, as a multi-stage polymer, wherein at least one of the stages is a polyimide according to this invention, with another thermoplastic polymer.

Generally, when blending polyimides prepared according to this invention, with other thermoplastic polymers, the amount of polyimide present may vary widely from about 1% to about 99%, by weight of the entire composition.

The advantage of blending a polyimide of this invention with at least one other thermoplastic polymer is that the resultant blends generally exhibit a better combination of properties which may include better melt viscosity, greater compatibility and/or miscibility, greater weatherability, greater impact resistance, better ductility, and better solvent resistance than the combination of properties of blends of polyimides which have not undergone diminution or substantial removal of acid and anhydride functionality.

The polyimides of this invention, particularly the polyglutarimides, may be blended with other thermoplastic polymers (as used herein "-" indicates blended polymers, "/" copolymers, and "//"" graft or block polymers) such as butadiene/styrene/(meth)acrylic, styrene/(meth)acrylic, and (meth)acrylic multistage polymers; butadiene/styrene rubbers, ethylene/propylene/diene rubbers, polyamides, polyamide-multistage polymer blends, ethylene/vinyl acetate, styrene/acrylonitrile, styrene/acrylonitrile-multistage polymer blends, styrene/acrylonitrile-ethylene/propylene/diene rubber blends, alpha-methylstyrene/acrylonitrile, alpha-methylstyrene/styrene/acrylonitrile, alpha-methylstyrene/methyl methacrylate/ethyl acrylate, butadiene//acrylontrile/styrene, polycarbonate, polycarbonate-multistage polymer blends, polybutylene terephthalate, polybutylene terepthalate-polycarbonate blends, polybutylene terephthalate-multistage polymer blends, polybutylene terephthalate/polytetrahydrofuran, polyvinyl chloride, polyvinyl chloride-multistage polymer blends, polyvinyl chloride-(meth)acrylate blends, chlorinated polyvinyl chloride, acrylonitrile/(meth)acrylate-multistage polymer blends, acrylonitrile/(meth)acrylate/styrene, epichlorohydrin/bisphenol-A, polyethylene terephthalate or other polyalkylene terephthalate, polyethylene terephthalate-glycol modified, polyethylene terephthalate-polycarbonate blends, polycaprolactone, polyarylate, copolyester of bisphenol-A with isophthalic and/or terephthalic acids, poly(meth)acrylates, polyacetal, polystyrene, high-impact polystyrene, styrene/maleic anhydride, styrene/maleimide, polyolefins, polyvinylidene fluoride, polyvinylidene fluoride-multistage polymer blends, cellulosics, polyethylene oxide, polyamideimide, polyetherester, polyetheresteramide and polyetheramide. Blends having modified performance characteristics can be prepared from any other polymer systems with polyimides. These include polyphenylene sulfide, polyphenylene oxide, polysulfone, polyphenylene oxidestyrene blends, polyphenylene oxide-high impact polystyrene blends, polyvinylidene chloride, polyvinylidene chloride/(meth)acrylintrile, polyvinylidene chloride/(meth)acrylate, polyvinyl alcohol, polyvinyl acetate, polyetheretherketone, polyetherimide, thermoplastic polyimides, and other polymer types. Random or block copolymers which combine the different functionalities can also be used, and ternary or higher blends can be made from combinations of any of these polymer types with the imide polymers.

The imide polymers and blends with other polymer systems can be further modified by the incorporation of glass or other fibers, or particulate fillers or reinforcing agents such as talc or other minerals, glass spheres, or metallic particles. In general, the imide polymers exhibit good adhesion to glass and other inorganic fillers. Further modification of properties of the polyimides and blends can be obtained by incorporating additives such as flame retardants, blowing agents, antioxidants, thermal stabilizers, pigments, flatting agents, lubricants, antistatic agents, conductive materials, toners or UV stabilizers.

In the Examples which follow, certain tests are conducted. These tests are as follows:

The Vicat is determined by ASTM Test Method 1525-65T using 40 mil penetration and heating rate B.

The total acid and anhydride functionality was determined by titrating solutions of the polymers in either 1:1 methylene dichloride-methanol or 3.75:1 dimethyl sulfoxide-water. A 0.3-g sample of the polymer is dissolved in 75 ml of methylene dichloride-methanol. A measured volume of 0.1N sodium hydroxide solution, containing more than enough base to neutralize the acid and anhydride in the sample, is added to the polymer solution, and the excess base is titrated with 0.1N hydrochloric acid. The total acid and anhydride functionality is the difference, in milliequivalents, between the added base and the acid solution used to reach neutrality, corrected by subtracting the acid titration value of a solvent blank (the blank is usually less than 5% of the total acid and anhydride functionality). If dimethylsulfoxide is used, the polymer is dissolved in 75 ml of dimethylsulfoxide, and 20 ml of water is added to the solution, which is then titrated as above. In the samples below, the end point of the titration was detected either colorimetrically or potentiometrically, and in some instances other solvents were used to prepare the polymer solution for titration.

The total acid and anhydride functionality of a copolymer or blend containing polymer components that are imidizable is calculated as milliequivalents per gram of the imidizable polymer components.

Molecular weight is determined by gel permeation chromatography using a commercial Waters instrument and a tetrahydrofuran solvent, and is a weight average molecular weight.

Dynamic thermogravimetric analysis (TGA), as used herein, is a standard test conducted using a programmed temperature-increase rate of 20° C. per minute and an atmosphere of either air or nitrogen, as indicated. Results given herein for TGA were either obtained using, or are consistent with those obtained using, a duPont thermogravimetric analyzer in combination with a differential thermal analyzer; specific operating instructions for the TGA instrument and for this particular test are described in E. I. duPont de Nemours, Inc. Instrument Products Division Preliminary Product Bulletin 950-1(A-36177).

Although compatibility and/or miscibility of blended polymers is not necessary to the compositions of the present invention, compatibility and/or miscibility of such blends may be enhanced by reduction of the acid and anhydride functionality. Measurements of glass transition temperature (T$_g$) and visual examination of polymer samples, as described below, help to quantify observations of such compatibility and/or miscibility enhancement.

The glass transition temperature (Tg) of polymer and blend samples is determined by differential scanning calorimetry (DSC), using a Perkin-Elmer Model DSC-2 calorimeter. The sample is heated in a nitrogen atmosphere at 20° C. per minute, and the reference material in the calorimeter is 60–80 mg aluminum. The Tg value is taken from the DSC chart as the temperature at the midpoint of the transition. All blend samples, prior to the DSC run, are preheated for one minute at a temperature 20° C. higher than the higher Tg value for either component in the blend, and then cooled to a temperature below the lower Tg value of either component.

The DSC values for Tg are usually sufficient to indicate whether a blend is miscible. However, if the Tg values of the two components are similar, or if one of the components undergoes a phase change (e.g. melting or recrystallization) near the Tg of the other component, the DSC result may not be adequate to detect whether the sample is miscible. In such a case other techniques for detecting miscibility may be used. For examples, domains indicating incompatibility in blend samples may be detected by transmission electron microscopy (TEM), and the sensitivity of this technique may, under some conditions, be enhanced, as by staining one of the phases. An example of this is staining phases containing carbon-carbon unsaturation using osmium tetroxide.

Compatibility or miscibility of polymer blends is determined by an examination of the blend of the polyimide with a specified polymer after mastication of the blend in a Brabender mixing device at a temperature of from 193° to 246° C. for ten minutes in an air atmosphere. Samples of the resulting blend are removed from the melt, formed into small, flattened "buttons" and examined visually for clarity. With some blends, the refractive indices of the two polymers are similar at room temperature, and incompatibility is difficult to detect by visual examination of the button sample. In such a case the button is observed at several different temperatures; the refractive indices of two immiscible components will change at different rates if one component is heated above its glass transition temperature.

In the examples which follow, the percent nitrogen of the polyimides used is set forth. The degree of imidization, by weight, may be calculated from the percent nitrogen given: divide the percent of nitrogen actually present in the polyimide by the theoretical amount of nitrogen at 100% imidization and multiply by 100.

In order to more fully illustrate the nature of this invention and the manner of practicing the same, the following examples are presented.

EXAMPLES 1 THROUGH 10

A polyglutarimide having N-methylimide groups, prepared in accordance with the procedure disclosed in U.S. Pat. No. 4,246,374, is used. The imide was prepared from a feedstock of poly(methyl methacrylate) having a weight average molecular weight of 200,000.

The extruder used is a 2.0 cm-diameter (0.8 inch) Welding Engineers non-intermeshing twin screw extruder. The extruder has one section about six diameters long, for introducing and plasticating the polyglutarimide followed by a closed barrel section about 6 diameters long for pumping and pressure generation, followed by the reaction zone. This zone, about 31.5 diameters long, comprises a ported barrel section for introducing blocking agents, closed barrel sections, and a venting section for removing volatile products. Another vented section, operated at substantially atmospheric pressure, follows the reaction zone, for removing additional volatiles.

The extruder is purged with the polyglutarimide, to remove contaminants. The polyglutarimide is then added to the plastication zone of the extruder at a rate of 60 grams per minute. At this time the barrel temperature in the reaction zone is about 300° C., and the blocking agent pressure is about 3500 kiloPascals (500 psig). The polymer resides in the extruder for an average of about 120 seconds.

The polyglutarimide used has a nitrogen content of 7.13 weight percent, as determined by micro Kjeldahl analysis, and a Vicat of 170° C.

The initial, total acid and anhydride of the polyglutarimide used is 0.585±0.020 milliequivalents per gram of imidizable component in the polymer.

In ten separate experiments, the polyglutarimide described above was processed in the extruder. For eight of the runs, trimethyl orthoformate was used for removing anhydride and acid functionality from the polyglutarimide. The extruder screw speed was, for all examples, 400 rpm. The trimethylorthoformate (TMOF) was pumped through a port into the inlet section of the extruder where it reacted with the polyglutarimide at a temperature of from 200° C. to 350° C. and a pressure of 3450±70 kiloPascals (500±10 psig).

In Table I, the letter "d" means that, prior to introduction in the extruder, the polyglutarimide is dried, under vacuum, at a temperature of 135° C. for eight to twelve hours. The letter "u" means that the polyglutarimide is not dried prior to introduction into the extruder. In Examples 3 and 4, no excess TMOF is added to the extruder. Table I sets forth the results obtained.

TABLE I

| Example No. | Agent feed rate (grams/minute) | Ratio (equivs./equivs.) of Agent to Acid and Anhydride | Extruder Reac. Zone Temp. °C. | Vicat of final products °C. | Acid & Anhydride Content of Final Product (meq./g.) |
|---|---|---|---|---|---|
| 1 d+ | none | 0.00 | 313 | 170 | 0.585 |
| 2 u+ | none | 0.00 | 304 | 170 | 0.569 |
| 3 d | 1.9 | 0.52 | 298 | 165 | 0.264 |
| 4 u | 1.9 | 0.52 | 290 | 170 | 0.545 |
| 5 d | 4.4 | 1.17 | 291 | 160 | 0.032 |
| 6 u | 4.8 | 1.30 | 298 | 160 | 0.300 |
| 7 d | 8.2 | 2.21 | 286 | 160 | 0.033 |
| 8 u | 7.8 | 2.08 | 292 | 160 | 0.032 |
| 9 d | 10.7 | 2.86 | 297 | 160 | 0.065 |

TABLE I-continued

| Example No. | Agent feed rate (grams/ minute) | Ratio (equivs./ equivs.) of Agent to Acid and Anhydride | Extruder Reac. Zone Temp. °C. | Vicat of final products °C. | Acid & Anhydride Content of Final Product (meq./g.) |
|---|---|---|---|---|---|
| 10 u | 10.9 | 2.92 | 299 | 161 | 0.031 |

+Comparative

Example 4 illustrates that when the polyglutarimide is not dried prior to reaction with the agent, there is an effect on the amount of agent available to react with acid and anhydride groups. In Example 5 (dried), a slight excess of agent, over the stoichiometric amount required, is used. The slight excess in Example 6 (undried), which is substantially the same as Example 5, results in a higher acid and anhydride content because of the reaction of water with the agent used, whereas in Example 5, the reaction is substantially quantitative. Example 8 (undried) illustrates that the effect of the reaction of water and TMOF can be overcome by using a sufficient excess of TMOF over the stoichiometric amount required.

EXAMPLES 11 THROUGH 14

The procedure of Examples 1-10 was repeated except that the agent used was triethyl orthoformate (TEOF), to convert the acid and anhydride functionality to an ethyl ester; all polyimides used were undried; the polyimide feed rate was 3 grams/minute; the TEOF feed rate is set forth in Table II; the screw speed of the extruder was 250 rpm; the temperature in the zone for reacting TEOF with the acid and anhydride groups was 302° C. The percent nitrogen in each of the polyimides of the examples was 7.13 wt. %. The initial acid and anhydride level of polyimide used was 0.585±0.020 milliequivalents per gram (meq./g) determined as in Examples 1-10. The results are set forth in Table II. The pressure in the reaction zone was 2900 kiloPascals (420 psig) for Example 12; 2345 kiloPascals (340 psig) for Example 13, and 2070 kiloPascals (300 psig) for Example 14.

TABLE II

| Example No. | Agent Feed rate (grams/ minute) | Ratio (equivs./ equivs.) of agent to acid and anhydride | Vicat of final product (°C.) | Acid & Anhydride Content of Final Product (meq./g.) |
|---|---|---|---|---|
| 11+ | none | 0.00 | 170 | 0.585 |
| 12 | 6.3 | 2.11 | 157 | 0.066 |
| 13 | 13.8 | 4.62 | 158 | 0.081 |
| 14 | 22.4 | 7.50 | 158 | 0.093 |

+Comparative

Examples 13 and 14 show that the removal of acid and anhydride groups is substantially complete in Example 12 and that the additional agent used in Examples 13 and 14 has little benefit over the amount of agent used in Example 12. The amount of acid and anhydride remaining in Examples 12, 13 and 14 are substantially the same and are within the experimental error of the titration method used, which is the same as is used in Examples 1-10.

EXAMPLES 15 THROUGH 20

The procedure of Examples 11 though 14 were repeated except that the agent used was trimethyl orthoformate (TMOF) and the polyimide used is a 201° C.-Vicat ammonia polyimide which has a nitrogen content of 7.72 weight %. The polyimide used had an acid and anhydride content of 0.610 milliequivalents per gram of polyimide, as determined by titrating it in a 3.75/1.0 dimethylsulfoxide/water solution. The polyimide samples used were not dried. The polyimide feed rate was 30 grams per minute. The pressure in the reaction zone was 2205 kiloPascals (320 psig) for Example 16; 3585 kiloPascals (520 psig) for Example 17; 3655 kiloPascals (530 psig) for Example 18; 3205 kiloPascals (465 psig) for Example 19; and 3035 kiloPascals (440 psig) for Example 20.

The results are set forth in Table III.

TABLE III

| Example No. | Agent Feed rate (grams/ minute) | Ratio (equivs./ equivs.) of agent to acid and anhydride | Vicat of final product (°C.) | Acid & Anhydride Content of Final Product (meq./g.) |
|---|---|---|---|---|
| 15+ | none | 0.0 | 201 | 0.610 |
| 16 | 1.0 | 0.48 | 198 | 0.432 |
| 17 | 1.9 | 0.97 | 198 | 0.311 |
| 18 | 2.9 | 1.45 | 192 | 0.000 |
| 19 | 3.9 | 1.93 | 190 | 0.000 |
| 20 | 7.7 | 3.81 | 192 | 0.000 |

+Comparative

EXAMPLES 21 THROUGH 27

The purpose of these examples is to illustrate a continuous process for making polyimides and reducing or substantially eliminating acid and anhydride functionality. In this continuous process, the amount of acid and anhydride of the polyimide prior to treatment with an agent may be determined by removing a sample of polyimide prior to reaction with the agent for reducing acid and anhydride functionality and titrating the amount of acid and anhydride present. A calculated amount of the agent, based on the desired acid and anhydride level, may then be added. Alternatively, prior to running the continuous process, one may determine the amount of agent to add by preparing the polyimide under the same conditions to be used in the continuous process, and then measuring the acid and anhydride level. As long as the feed stock is converted to the same polyimide and treated with the agent under the same conditions, the resultant final product should be substantially the same in both cases.

The apparatus of examples 1-10 is used in examples 21 through 27 except that an imidization zone measuring 2.0 cm by 61 cm (0.8 inch by 24 inches) is added to the apparatus as the first zone. The imidization zone also contains a double screw. The feed which is added to the imidization zone is poly(methyl methacrylate) (PMMA) having a weight average molecular weight of 148,000. The PMMA feed rate is 45 grams per minute. To the PMMA in the imidization zone is added methylamine. The barrel temperature of the imidization zone was 302° C.±5° C. The gauge pressure in the imidization zone for Example 21 was 6137 kiloPascals (890 psig); for Example 22 was 6205 kiloPascals (900 psig); for Example 23 was 6275 kiloPascals (910 psig); for Example 24 was 6275 kiloPascals (910 psig); for Example 25 was 6171 kiloPascals (895 psig); and for Example 26 was 7240 kiloPascals (1050 psig). In Example 21 and 26 the polyimides were not treated with any agent after preparation. The procedure of Examples 1–10 for removing acid and anhydride was then repeated. The agent used was trimethyl orthoformate (TMOF). The temperature of the TMOF/polyimide reaction zone was 304° C.±5° C. The pressure in the TMOF/polyimide reaction zone for Example 22 was 2413 kiloPascals (350 psig); for Example 23 was 3172 kiloPascals (460 psig); for Example 24 was 3103 kiloPascals (450 psig); for Example 25 was 3068 kiloPascals (445 psig); for Example 26 was atmospheric pressure (0.00 psig); and for Example 27 was 3103 kiloPascals (450 psig).

Table IV sets forth the results obtained.

a Vicat of 170° C. and a nitrogen content of 7.24 weight percent. The polyimide used in Examples 37 and 38 was a polymethylimide having a Vicat of 162° C. and a nitrogen content of 3.08 weight percent. The pressure in the agent reaction zone was 2900 kiloPascals (420 psig) for Example 29; 2793 kiloPascals (405 psig) for Example 30; 2137 kiloPascals (310 psig) for Example 32; 2124 kiloPascals (308 psig) for Example 34; 2827 kiloPascals (410 psig) for Examples 35 and 36; and 2137 kiloPascals (310 psig) for Examples 38.

Examples 28–30 used polyimide dried in the manner of Examples 1–10. Examples 31–38 used an undried polyimide. The initial acid and anhydride level of the polyimide of Examples 28–30 was 0.618 milliequivalents per gram (meq/g) of polyimide. The polyimide of Examples 33–36 had an initial acid and anhydride level of 0.570 meq/g. The polyimide of Examples 31 and 32 was prepared from a 90/10 methyl methacrylate/styrene feedstock and contained 4.90 weight percent nitrogen and an initial acid and anhydride level of 0.689 meq/g of imidizable polymer component. The polyimide of Examples 37 and 38 was prepared from a 73.5/24.5/2.0 methyl methacrylate/alpha-methylstyrene/ethyl acrylate feedstock, and had a nitrogen content of 3.08 weight percent and an initial acid and anhydride level of 0.975 meq/g of imidizable polymer component. The results are set forth in Table V.

TABLE IV

| Example No. | Rate of formation of polyimide (gram/min) | Methyl amine feed rate (grams/min) | Agent feed rate (grams/min) | Ratio (equivs./equivs.) of agent to acid and anhydride | Polyimide Vicat (°C.) | % Nitrogen of Polyimide | Polyimide wt. av. Mw × 10$^{-3}$ | Acid & Anhydride Content of final product (meq./g.) |
|---|---|---|---|---|---|---|---|---|
| 21+ | 38.8 | 14.6 | 0.00 | 0.00 | 168 | 6.80 | 131 | 0.575 |
| 22 | 38.8 | 14.6 | 1.46 | 0.61 | 164 | 6.63 | 130 | 0.251 |
| 23 | 38.8 | 14.6 | 3.10 | 1.31 | 157 | 6.83 | 127 | 0.000 |
| 24 | 38.8 | 14.6 | 4.85 | 2.05 | 158 | 6.79 | 131 | 0.000 |
| 25 | 38.8 | 14.6 | 8.73 | 3.69 | 157 | 6.77 | 138 | 0.000 |
| 26+ | 38.4 | 19.9 | 0.00 | 0.00 | 184 | 7.34 | 119 | 0.678 |
| 27 | 38.4 | 17.9 | 8.73 | 3.16 | 168 | 7.33 | 128 | 0.000 |

+Comparative

EXAMPLES 28 TO 34

The procedure of Examples 11 through 14 was repeated with the following changes. In Examples 28, 31, 33 and 37 the imides were not treated with an agent to substantially remove or reduce acid and anhydride functionality. The agent used in Examples 29, 30 and 32 was dimethyl carbonate (DMC). Examples 30 and 32 also utilized triethylamine (TEA) as a catalyst for the reaction between the agent and the acid and anhydride groups. The TEA was added at a feed rate of 0.09 gram per minute in Example 20, and 0.11 gram per minute in Example 32. The agent used for Examples 34–36 was 2,2-dimethoxypropane (DMP). The polyimide used in Examples 28 through 30 was polymethylimide having a Vicat of 172° C. and a nitrogen content of 7.04 weight percent. The polyimide used in Examples 31 and 32 was a polymethylimide having a Vicat of 150° C. and a nitrogen content of 4.90 weight percent. The polyimide used in Examples 33–36 was a polymethylimide having

TABLE V

| Example No. | Agent Feed rate (grams/minute) | Ratio (equivs./equivs.) of agent to acid and anhydride | Agent | Vicat of final product (°C.) | Acid & Anhydride Content of Final Product (meq./g.) |
|---|---|---|---|---|---|
| 28+ | none | 0.00 | | 172 | 0.618 |
| 29 | 4.3 | 2.56 | DMC | 163 | 0.087 |
| 30 | 4.2 | 2.51 0.05 | DMC TEA | 162 | 0.005 |
| 31+ | none | 0.00 | | 150 | 0.689 |
| 32 | 5.2 | 3.15 0.06 | DMC TEA | 144 | 0.020 |
| 33+ | none | 0.00 | | 170 | 0.570 |
| 34 | 2.1 | 1.19 | DMP | 169 | 0.478 |
| 35 | 4.4 | 2.48 | DMP | 166 | 0.376 |
| 36 | 8.6 | 4.86 | DMP | 166 | 0.345 |
| 37+ | none | 0.00 | none | 162 | 0.975 |
| 38 | 9.0 | 3.15 | TMOF | 150 | 0.040 |

$^1$DMC = dimethyl carbonate
TEA = triethylamine
DMP = 2,2-dimethoxypropane
TMOF = trimethyl orthoformate
+Comparative

EXAMPLES 35 THROUGH 44

These examples illustrate the removal of acid and anhydride functionality from polyimides using a solution reaction. The polyimide used for Examples 35 through 44 was the polyimide of Examples 1-10. The procedure for Examples 35-44 is as follows.

To a 3-neck, 500 ml round-bottom flask equipped with a magnetic stirrer and reflux condenser is added 250 ml. of a solvent. A 12.5-g polyimide sample is dissolved in the solvent and the agent is then added to the solution. The resulting solution is then heated to a temperature of from 160° C. to 175° C., under nitrogen, for varying periods of time. The solution is then cooled to room temperature and the final product is precipitated by adding it to methanol; it is then filtered and dried. The acid and anhydride level of the final product is determined as in Examples 1-10. The results are given in Table VI.

TABLE VI

| Example No. | Solvent | Agent[1] and grams of Agent | Reaction Temp. (°C.) | Reaction Time (hrs.) | Ratio (equivs./ equivs.) of agent to acid and anhydride | Acid & Anhydride content Content of Product (meq./g.) |
|---|---|---|---|---|---|---|
| 35+ | diglyme | none/0.0 | 160 | 8.0 | 0.0 | 0.508 |
| 36 | diglyme | TMOF/7.6 | 160 | 4.0 | 9.8 | 0.170 |
| 37 | diglyme | TMOF/7.6 | 160 | 8.0 | 9.8 | 0.061 |
| 38 | triglyme | TEOF/10.6 | 175 | 2.0 | 9.8 | 0.385 |
| 39 | triglyme | TEOF/10.6 | 175 | 3.5 | 9.8 | 0.227 |
| 40 | triglyme | TEOF/10.6 | 175 | 5.0 | 9.8 | 0.128 |
| 41 | triglyme | TEOF/10.6 | 175 | 7.0 | 9.8 | 0.063 |
| 42 | triglyme | TEOF/10.6 | 175 | 8.2 | 9.8 | 0.065 |
| 43 | dimethylsulfoxide | DMSO/275 | 170 | 3.0 | 482 | 0.263 |
| 44 | dimethylsulfoxide | DMSO/275 | 170 | 7.0 | 482 | 0.217 |

[1]TMOF = trimethl orthoformate
TEOF = triethylorthoformate
DMSO = dimethylsulfoxide
diglyme = diethyleneglycol dimethyl ether
triglyme = triethyleneglycol dimethyl ether
+Comparative

EXAMPLES 45 THROUGH 49

The purpose of these Examples is to demonstrate the change in chemical resistance for the various polyimides which have been prepared. The following Examples utilize the imides prepared in earlier Examples.

Examples 45 utilizes the polyimide prepared in Example 1.

Example 46 utilizes the polyimide prepared in Example 12.

Example 47 utilizes the polyimide prepared in Example 5.

Example 48 utilizes the polyimide prepared in Example 26.

Example 49 utilizes the polyimide prepared in Example 27.

The imides used in Examples 45 and 48 were not treated to remove acid and anhydride groups. The polyimides used in Examples 48 and 49 were prepared using a continuous process for the preparation of the polyimide and removal of acid and anhydride groups.

The polyimides used in these Examples were injection molded to form 5.1×1.3×0.32-cm (2×0.5×0.125-inch) bars. The weights of the molded bars were determined and each bar was immersed in a different solvent, which was kept at a temperature of 23° C., for seven days. The bars were then removed from the solvent and the percent weight gain or weight loss was then measured by reweighing the bars. For determining water absorption, a 0.25-mm-thick film of imide was prepared by compression molding predried imide pellets. The film was dried, weighed, immersed in water for fourteen days at a temperature of 50° C., and reweighed.

The results are set forth in Table VII.

TABLE VII

| Example No. | Water Absorption (% Weight Loss or Gain) | Percent Wt. Change-Immersion at 23° C. for 7 days | | | | |
|---|---|---|---|---|---|---|
| | | Ammonium Hydroxide (10% aq.) | Methanol | Ethanol | 1,1,1-trichloroethane | Toluene |
| 45+ | 4.9 | 12.3 | 14.9 | 1.7 | 0.37 | 0.18 |
| 46 | 3.3 | 0.98 | | No Data | | |
| 47 | 3.8 | 0.83 | 7.1 | 0.64 | −13 | −35 |
| 48+ | 6.0 | 16.5 | 19.3 | 2.52 | 0.23 | 0.28 |
| 49 | 3.9 | 0.85 | 8.3 | 0.82 | −11 | −33 |

+Comparative

As can be seen from Table VII, those polyimides which have had acid and anhydride levels reduced or substantially eliminated absorb less water than polyimides having untreated acid and anhydride levels. This indicates that weatherability would be better for those polyimides having reduced acid and anhydride levels.

Table VII also demonstrates that resistance to ammonium hydroxide, methanol and ethanol is better for those polyimides which have been treated to substantially remove or reduce acid and anhydride levels when compared to untreated polyimides.

Table VII also demonstrates that the treated polyimides are somewhat soluble in 1,1,1-trichloroethylene and toluene whereas the untreated polyimides are not soluble. This indicates that the treated polyimides may be dissolved, to some extent, in some solvents and may therefore be used as coating compositions whereas the untreated polyimides are not soluble in those solvents.

EXAMPLES 50 THROUGH 57

These examples demonstrate the effect of weathering on various polyimides which have been treated with an agent to remove acid and anhydride groups. The polyglutarimides used in Examples 54 through 57 correspond to the polyglutarimides used in Examples 50 through 53 except that the procedure of Examples 1 through 10 is used to treat the polyglutarimides. The agent used in treating the polyglutarimides is, in each case, trimethyl orthoformate. Example 54 is the treated counterpart of Example 50; Example 55 is the treated counterpart of Example 51; Example 56 is the treated counterpart of Example 52; and Examples 57 is the treated counterpart of Example 53. The milliequivalents of acid and anhydride per gram of imidizable group are set forth in Table VIII. The weight percent nitrogen for each of the polyglutarimides used is also set forth in Table VIII.

The weathering tests employed a Xenon Arc Weather-o-meter in the modified (extreme) test mode, according to ASTM method G26-83. Test samples were molded into 5.1×7.6×0.32-cm (2×3×0.125-inch) plaques. The test conditions include a 2-hour cycle: 80 minutes dry (76.7° C. black body temperature, 50% relative humidity) and 40 minutes wet (sprayed distilled water). The light level was 6500 watts throughout. Table VIII sets forth the results obtained.

10. The polyglutarimides prepared in Examples 58 through 72 were then evaluated for miscibility and compatibility with other polymers. A letter designation is assigned to each example and that letter designation is utilized in later examples in which miscibility and compatibility properties are given. Table IX sets forth the polyglutarimide and its properties. The $T_g$ was determined by differential scanning calorimetery.

TABLE IX

| Example No. | Letter ID | Vicat °C. | $T_g$ | % Nitrogen by Wt. | Degree Imidization by Weight | Treated (T) or Untreated (UT) | Wt. Av. Molecular Wt. × $10^{-3}$ | No. Av. Molecular Weight × $10^{-3}$ | Milliequivalents of Acid & Anhydride per gram of Imidizable Component |
|---|---|---|---|---|---|---|---|---|---|
| 58 | A | 150 | 147 | 5.6 | 67 | UT | 160 | 68.0 | 0.504 |
| 59 | B | 146 | 143 | 5.6 | 67 | T | 157 | 66.5 | 0.101 |
| 60 | C | 165 | 162 | 6.5 | 78 | UT | 124 | 49.6 | 0.452 |
| 61 | D | 157 | 155 | 6.4 | 76 | T | 120 | 49.0 | 0.094 |
| 62 | E | 167 | 164 | 6.8 | 81 | UT | 131 | 54.5 | 0.513 |
| 63 | F | 157 | 158 | 7.1 | 84 | T | 124 | 53.7 | 0.011 |
| 64 | G | 170 | 168 | 6.9 | 82 | UT | 145 | 62.4 | 0.624 |
| 65 | H | 160 | 158 | 7.1 | 84 | T | 129 | 56.4 | 0.002 |
| 66 | I | 170 | 168 | 7.1 | 84 | UT | 116 | 51.5 | 0.585 |
| 67 | J | 169 | 165 | 7.0 | 83 | T | 110 | 42.8 | 0.512 |
| 68 | K | 162 | 162 | 7.0 | 83 | T | 110 | 45.7 | 0.354 |
| 69 | L | 161 | 158 | 7.0 | 83 | T | 107 | 44.5 | 0.191 |
| 70 | M | 156 | 155 | 6.9 | 82 | T | 107 | 44.5 | 0.045 |
| 71 | N | 179 | 175 | 7.6 | 91 | UT | 135 | 59.9 | 0.798 |
| 72 | O | 165 | 163 | 7.5 | 90 | T | 115 | 47.2 | 0.002 |

Molecular Weights are determined by gel permeation chromatography in tetrahydrofuran.
Milliequivalents of acid and anhydride per gram of imidizable group is determined by titration using methylene dichloride/methanol as set forth in other examples.

TABLE VIII

| Example No. | % Nitrogen | Milliequivalents of Acid & Anhydride Per Gram | Total Hrs. Of Exposure in Weather-o-meter vs Degree of Surface Crazing[1] | | | | | |
|---|---|---|---|---|---|---|---|---|
| | | | 500 | 1000 | 1500 | 2000 | 2500 | 3000 |
| 50+ | 5.28 | 0.349 | N | N | N | VL | VL | MH |
| 51+ | 6.27 | 0.460 | N | N | N | VL | VL | H |
| 52+ | 6.87 | 0.624 | N | N | VL | L | H | VH |
| 53+ | 7.59 | 0.798 | N | VL | LM | MH | VH | VH |
| 54 | 5.66 | 0.033 | N | N | N | N | N | N |
| 55 | 6.39 | 0.035 | N | N | N | N | N | N |
| 56 | 7.06 | 0.002 | N | N | N | N | N | N |
| 57 | 7.04 | 0.002 | N | N | N | N | N | MH |

[1]N = none
VL = very light
L = light
LM = light to medium
M = medium
MH = medium to heavy
H = heavy
VH = very heavy
+Comparative As can be seen from Table VIII, when a polyglutarimide is treated to substantially remove or reduce the acid and anhydride levels, the weatherability of the resultant treated polyglutarimide is much superior to that of the untreated polyglutarimides.

EXAMPLES 58 THROUGH 72

A number of N-methyl polyglutarimides were prepared in accordance with the teachings of U.S. Pat. No. 4,246,374. Some of the polyglutarimides were then treated with an agent in the manner of Examples 1 through 10, using the agent used in Examples 1 through

EXAMPLES 73 THROUGH 81

A number of 50/50 weight/weight blends were prepared with the polyglutarimides of Examples 58 through 72. The polymer blended with the various polyglutarimides was a styrene-acrylonitrile copolymer composed of 75% by weight styrene and 25% by weight acrylonitrile. The $T_g$ for the polyglutarimide, the blend of polyglutarimide and polymer, and the polymer with which the polyglutarimide was blended, was determined. The presence of a single $T_g$ for the blend indicates complete compatibility.

The blends were prepared by melt mixing the polyglutarimide and the styrene-acrylonitrile copolymer in a Brabender melt mixer at a temperature of 232° C. Small (0.9×0.15-cm) buttons were formed from the melt.

Table X sets forth the results obtained.

TABLE X

| Example No. | Polyglutarimide Used (Table IX) | Observed $T_g$ Values °C. | Appearance of Blend |
|---|---|---|---|
| 73+ | I | 165/113 | Opaque |
| 74 | J | 165/113 | Opaque |
| 75 | K | 161/114 | Translucent |
| 76 | L | 154/119 | Almost Clear |
| 77 | M | 128 | Clear |
| 78+ | E | 178/113 | Opaque |
| 79 | O | 131 | Clear |
| 80+ | E | 164/112 | Translucent |
| 81 | F | 130 | Clear |
| 82+ | C | 157/113 | Translucent |
| 83 | D | 125 | Clear |
| 84+ | A | 125 | Clear |
| 85 | B | 124 | Clear |

+Comparative

In Examples 73 through 77, the following should be noted. The glutarimide of Example 73 has not been treated with any agent to remove acid and anhydride functionality. The polyglutarimides of Examples 74 through 77 have been treated to remove acid and anhydride functionality but the amount of acid and anhydride remaining varies so that, as one proceeds from Example 74 through Example 77, the milliequivalents of acid and anhydride in each of these examples changes. Example 73 has 0.585 milliequivalents of acid per gram of imidizable group; Example 74 has 0.512 milliequivalents of acid; Examples 75 has 0.354 milliequivalents of acid; Example 76 has 0.191 milliequivalents of acid; and Examples 77 has 0.045 milliequivalents of acid. As the amount of acid and anhydride in the polyglutarimide decreases, the compatibility of the polyglutarimide with the styrene-acrylonitrile copolymer increases as is seen by the appearance or by the single $T_g$ of the blend. In Examples 78 through 85, all of the even-number examples are of polyglutarimides which have not been treated to remove acid and anhydride functionality. The immediate following, odd-numbered example is of the same polyglutarimide treated to remove acid and anhydride functionality. It is therefore clear that compatibility of the treated polyglutarimides with styrene-acrylonitrile copolymer is enhanced. Attention is invited to Example 84, wherein the polyglutarimide is not treated and the blend is clear and shows a single $T_g$ for the blend. It is known from U.S. Pat. No. 4,436,871 that certain polyglutarimides are compatible with styrene-acrylonitrile copolymers even though no steps have been taken to remove acid and anhydride functionality.

EXAMPLES 86 THROUGH 89

The procedure of Examples 73 through 85 was repeated except that the polymer with which the polyglutarimide was blended is changed. The polymer used in Examples 86 through 89 was Abson® 89140 which is an ABS (acrylonitrile/butadiene/styrene terpolymer supplied by Mobay Chemical Company.) All polymer blends were opaque to translucent rather than clear, due to the fact that the initial index of refraction between the rubber and hard phases does not match. However, appearance of a single $T_g$ for the blend indicates compatibility of the polyglutarimide with the ABS polymer ($T_g$ values for the rubber phase are not shown). The results are set forth in Table XI.

TABLE XI

| Example Number | Polyglutarimide Used | Observed $T_g$ Values (°C.) | Appearance of Blend |
|---|---|---|---|
| 86+ | N | 168/108 | Opaque |
| 87 | O | 129 | Semi Opaque |
| 88+ | E | 155/108 | Translucent |
| 89 | F | 128 | Hazy clear |

+Comparative

As is seen from Table XI, Examples 86 and 88 utilize polyglutarimides wherein no steps have been taken to remove acid and anhydride functionality from the polyglutarimide. The results of Examples 87 and 89 show a single $T_g$ for the blend thus demonstrating compatibility of the treated polyglutarimide with the polymer. The material in Example 87 is the material from Example 86, but treated. Similarly, the material in Example 89 is the material from Example 88, but treated.

EXAMPLES 90 THROUGH 97

The procedure of Examples 73 through 85 was repeated except that the polymer used was Blendex® 586, obtained from Borg-Warner Company. It is believed that Blendex 586 is a terpolymer of alpha methylstyrene/styrene/acrylonitrile. The results are expressed in Table XII.

TABLE XII

| Example No. | Polyglutarimide Used | Observed $T_g$ Values °C. | Appearance |
|---|---|---|---|
| 90+ | N | 171/129 | Opaque |
| 91 | O | 142 | Clear |
| 92+ | G | 161/128 | Opaque |
| 93 | H | 138 | Clear |
| 94+ | C | 140 | Clear |
| 95 | D | 137 | Clear |
| 96+ | A | 136 | Clear |
| 97 | B | 134 | Clear |

+Comparative

Attention is invited to the fact that in Examples 90 and 92, the polyglutarimide is not treated to remove acid and anhydride functionality and the blends are opaque. In Examples 94 and 96, the polyglutarimides are also not treated to remove acid and anhydride functionality and the blends are clear and exhibit only a single $T_g$ for the blend. The difference resides in the fact that the degree of imidization for Examples 96 and 94 are 67% and 78%, respectively, and the acid and anhydride levels for Example 96 is 0.504 milliequivalents and for Example 94 is 0.452 milliequivalents. When Examples 96 and 94 are compared with Examples 90 and 92, it is seen that Examples 90 and 92 have a higher degree of imidization and a higher acid and anhydride content. The degree of imidization for Example 90 is 91% and the amount of acid and anhydride is 0.798 milliequivalents and the degree of imidization for Example 92 is 82% and the acid and anhydride content is 0.624 milliequivalents. Although the blends for certain non-treated polyglutarimides are clear and exhibit only a single $T_g$, other properties are altered, such as weatherability.

EXAMPLES 98 TO 119

Exmples 98 to 119 show that polycarbonate of two different molecular weights and Phenoxy® resin (a condensation polymer of epichlorohydrin and bisphenol-A) all show partial to almost complete miscibility with various imides upon melt blending. The alkylated imides uniformly show higher miscibility with these polycarbonate polymers. The similarity of imide and polycarbonate $T_g$'s makes the DSC data in some of the below cases a less reliable indication of miscibility. In these cases the physical appearance is a more important gauge of miscibility. The results of these examples are shown in Table XIII.

TABLE XIII

| Example No. | Imide Source (Example) | Imide Vicat (°C.) Type[1] | Imide $T_g$(°C.) by DSC[2] | Imide % by wt.[3] | meq/g total acid[4] | Imide/Polymer Ratio | Observed $T_g$(°C.) by DCS[5] | Appearance[6] |
|---|---|---|---|---|---|---|---|---|
| 98+ | 71 | 179UC | 175 | 91 | 0.798 | 50/50 | 178/150 | OP |
| 99 | 72 | 165/C | 163 | 90 | 0.002 | 50/50 | 165/152 | OP/TL |
| 100+ | 62 | 167/UC | 164 | 81 | 0.513 | 50/50 | 166/152 | OP |
| 101 | 63 | 157/C | 158 | 84 | 0.011 | 50/50 | 155 (Bd[7]) | OP/TL |
| 102+ | 60 | 165/UC | 162 | 78 | 0.452 | 50/50 | 149 (Bd[7]) | OP |

TABLE XIII-continued

| Example No. | Imide Source (Example) | Imide Vicat (°C.) Type[1] | Imide $T_g$(°C.) by DSC[2] | Imide % by wt.[3] | meq/g total acid[4] | Imide/ Polymer Ratio | Observed $T_g$(°C.) by DCS[5] | Appearance[6] |
|---|---|---|---|---|---|---|---|---|
| 103 | 61 | 157/C | 155 | 76 | 0.094 | 50/50 | 146 (Bd[7]) | OP/TL |
| 104+ | 58 | 150/UC | 147 | 67 | 0.504 | 50/50 | 143 (Bd[7]) | OP |
| 105 | 59 | 146/C | 143 | 67 | 0.101 | 50/50 | 142 (Bd[7]) | OP/TL |
| 106+ | 62 | 167/UC | 164 | 81 | 0.513 | 80/20 | 159 | TL |
| 107 | 63 | 157/C | 158 | 84 | 0.111 | 80/20 | 159 | TL/TP |
| 108+ | 62 | 167/UC | 164 | 81 | 0.513 | 20/80 | 150 | TL |
| 109 | 63 | 157/C | 158 | 84 | 0.011 | 20/80 | 152 | TL/TP |
| 110+ | 71 | 179UC | 175 | 91 | 0.798 | 50/50 | 175/147 | OP |
| 111 | 72 | 165/C | 163 | 90 | 0.002 | 50/50 | 164/148 | OP/TL |
| 112+ | 62 | 167/UC | 164 | 81 | 0.513 | 50/50 | 167/159 | OP |
| 113 | 63 | 157/C | 158 | 84 | 0.011 | 50/50 | 152 | OP/TL |
| 114+ | 60 | 165/UC | 162 | 78 | 0.452 | 50/50 | 149 (Bd[7]) | OP |
| 115 | 61 | 157/C | 155 | 76 | 0.094 | 50/50 | 149 (Bd[7]) | OP/TL |
| 116+ | 58 | 150/UC | 147 | 67 | 0.504 | 50/50 | 149 (Bd[7]) | OP |
| 117 | 59 | 146/C | 143 | 67 | 0.101 | 50/50 | 140 (Bd[7]) | OP/TL |
| 118+ | 64 | 170/UC | 168 | 82 | 0.624 | 50/50 | 162/104 | OP/TL |
| 119 | 65 | 160/C | 158 | 84 | 0.002 | 50/50 | 118 | Clear |

[1]Imides are all undried methyl imides; UC = unalkylated, C = alkylated.
[2]Undried imides.
[3]Imide weight % imidization level calculated for methyl imides form 100 (% N/8.377% = I.
[4]Titrable acid in the imide per gram of sample (0.020 meq/g, titrated in MDC/MeOH - 1/1
[5]Since the PC and imide $T_g$'s are similar, appearance is a better test of miscibility in this case.
[6]OP = Opaque; TL = translucent; TP = transparent; CL = clear.
[7]Bd = Broad
+Comparative
Note: The blended polymer for Examples 98-109 is Polycarbonate M50, for Examples 110-117 is Polycarbonate M39, and for Examples 118 and 119 is Phenoxy resin.

EXAMPLES 120 TO 125

Examples 120 and 121 show that Dylark ® 332 (approximately 86/14-styrene/maleic anhydride, by our analysis) is miscible with a 67% imidized alkylated methyl imide (imide from Example 59), but not with the corresponding unalkylated imide (imide from Example 58).

An ammonia imide was prepared by treating Dylark 332 at 49 g/m and 260° C. in an extruder with 3.9 g/m anhydrous ammonia at 2826 kPa or 410 psig. according to the Kopchik process (U.S. Pat. No. 4,246,374). The resulting imide contained from 0.000 to 0.070 meq/g of acidic functionality and had a nitrogen level of 1.88 weight percent (for 14.1% maleimide, % N theoretical=2.01%), indicating about 94 weight % imidization.

The Vicat for Dylark 332 was 136° C., ($T_g$=130° C.) and for the ammonia imide was 151° C. ($T_g$=145° C.).

When the same unalkylated and alkylated methyl imides used in Examples 120 and 121 were melt blended with this Dylark-based ammonia imide, both blends were observed to be largely to completely miscible, indicating an inherently greater interaction between the acrylic imides and the maleimides versus the maleic anhydride polymer. When the Dylark 332 ammonia derivative was melt blended with a more highly imidized, unalkylated (Example 124) and alkylated (Example 125) acrylic imide, miscibility differences could again be observed between the alkylated and unalkylated blends. Following the previous pattern, the alkylated imide (imide F, Example 125) was completely miscible, while the unalkylated imide (imide E, Example 124) was only partially miscible.

TABLE XIV

| Example No. | Imide Source (Example) | Imide Vicat (°C.)/ Type[1] | Imide $T_g$ (°C.) | Imide % by wt.[3] | meq/g total acid[4] | Polymer/ Polymer $T_g$ | Polymer Ratio | Observed $T_g$(°C.) by DSC | Appearance[5] |
|---|---|---|---|---|---|---|---|---|---|
| 120+ | 58 | 150/UC | 147 | 67 | 0.504 | Dylark-332/130 | 50/50 | 143/130 | OP |
| 121 | 59 | 146/C | 143 | 67 | 0.101 | Dylark-332/130 | 50/50 | 134 | TL |
| 122+ | 58 | 150/UC | 147 | 67 | 0.504 | Imide A[6]/145 | 50/50 | 147 | TL/CL[7] |
| 123 | 59 | 146/C | 143 | 67 | 0.101 | Imide A[6]/145 | 50/50 | 146 | CL |
| 124+ | 62 | 167/UC | 164 | 81 | 0.513 | Imide A[6]/145 | 50/50 | 150 Bd[8] | OP |
| 125 | 63 | 157/C | 158 | 84 | 0.011 | Imide A[6]/145 | 50/50 | 153 | CL |

[1]Imides are all undried methyl imides; UC = unalkylated, C = alkylated.
[2]For undried imides.
[3]Imide weight % imidization level calculated for methyl imides from 100 (% N/8.377%) = % I.
[4]Milliequivalents of titratable acid in the imide per gram of sample (± ca. 0.020 meq/g, titrated in MDC/MeOH - 1/1).
[5]OP = opaque; TL = translucent; TP = transparent; CL = clear.
[6]Imide A is the ammonia imide prepared from Dylark 332, as described in the text.
[7]Clear with a trace of turbidity.
[8]Bd = Broad
+Comparative

EXAMPLES 126 TO 134

TABLE XV

| Example No. | Imide Source (Example) | Imide Vicat (°C.)/ Type[1] | Imide $T_g$(°C.) by DSC[2] | Imide % by wt.[3] | meq/g total acid[4] | Blended Polymer/ Polymer $T_g$ | Imide/ Polymer Ratio | Observed $T_g$(°C.) by DSC[5] | Appearance[8] |
|---|---|---|---|---|---|---|---|---|---|
| 126+ | 64 | 170/UC | 168 | 82 | 0.624 | — | 100/0 | 168 | CL |
| 127+ | — | — | — | — | — | Kynar 720/CE[5] | 0/100 | CE[5] | OP/TL[6] |
| 128+ | 64 | 170/UC | 168 | 82 | 0.624 | Kynar 720/CE[5] | 50/50 | CE[5] | OP/TL[6] |
| 129 | 65 | 160/C | 158 | 84 | 0.002 | Kynar 720/CE[5] | 50/50 | 78[5] | CL |
| 130 | 65 | 160/C | 158 | 84 | 0.002 | Kynar 720/CE[5] | 75/25 | 126 | TL |
| 131 | 65 | 160/C | 158 | 84 | 0.002 | Kynar 720/CE[5] | 80/20 | 130 | TL |
| 132 | 65 | 160/C | 158 | 84 | 0.002 | Kynar 720/CE[5] | 85/15 | 138 | T/CL[7] |
| 133 | 65 | 160/C | 158 | 84 | 0.002 | Kynar 720/CE[5] | 90/10 | 145 | CL/TL[7] |
| 134 | 65 | 160/C | 158 | 84 | 0.002 | Kynar 720/CE[5] | 95/5 | 152 | CL |

[1]Imides are all undried methyl imides; UC = unalkylated, C = alkylated.
[2]For undried imide.
[3]Imide weight % imidization level calculated for methyl imides from (% N/8.377%) = % I.
[4]Milliequivalents of titratable acid in the imide per gram of sample (± ca. 0.020 meq/g, titrated in MDC/MeOH - 1/1).
[5]CE indicates crystallization endotherm which obscures any amorphous $T_g$ in polyvinylidene fluoride and any nearby $T_g$ in the blended imide polymer.
[6]Polyvinylidene fluoride is translucent to opaque due to crystallinity.
[7]Appearance T/CL was translucent-to-clear (clear with a trace of turbidity), while CL/T was completely clear.
[8]OP = Opaque; TL = Translucent; TP = Transparent; CL = Clear
+Comparative.

Examples 126 to 134 show that polyvinylidene fluoride (Kynar® 720) is miscible with alkylated methyl imide but not unalkylated methyl imide (at this imidization level), thus following the same pattern as seen previously. The blends in examples 128 and 129 were prepared on a Brabender melt-mixing device, while examples 130 to 134 were extrusion blended on a 1" Killion extruder. Kynar polyvinylidene fluoride (PVDF) is a crystalline polymer which shows a large crystallization endotherm (CE) by DSC analysis, which obscures any nearby amorphous $T_g$ in polyvinylidene fluoride and any nearby $T_g$ in the blended imide polymer (Example 128). Since it is crystalline, it is also translucent to opaque. The miscibility of polyvinylidene fluoride and the imide from Example 65 (Example 129) supresses crystallization, giving an amorphous polymer blend with a single $T_g$. The levels of clarity and $T_g$'s of the blends indicate that while either miscibility or mixing was not complete in all samples, the level of miscibility was quite high. The tensile properties of the imide/Kynar blends also indicate that as little as 5% Kynar polymer gives a ductile material as measured by tensile elongation. The percent elongation to break for Examples 126 and 130–134 are: 5% for Example 126, (no yield), 11% for Example 134, (greater than 6% elongation indicates yielding), 67% for Example 133, 72% for Example 132, 83% for Example 131, and 101% for Example 130. That imides may be used to provide an amorphous polyvinylidene fluoride is also clear from these results.

EXAMPLES 135 TO 143

The miscibility of Kynar 720 polyvinylidene fluoride (PVDF) may be exploited to provide enhanced impact resistance in imide blends containing grafted rubber impact modifiers. Example 135 shows typical impact, tensile, and heat-distortion temperature data for an impact-modified blend of unalkylated, 170° C. Vicat methylimide, in which the impact modifier (A) was designed to give a high notched Izod impact resistance. Example 136 shows that the same imide, when alkylated, maintains good isotropic impact resistance (Gardener falling dart impact, GVHIT), but loses notched Izod impact resistance. However, when the modifier (B) is specifically designed for the difference in miscibility of the alkylated imide (Example 138), an excellent notched Izod and falling dart impact resistance is maintained. These values diminish in the unalkylated imide (Example 137). Examples 139 and 140 show that as small amounts of PVDF are substituted for the alkylated imide in the modifier B formulation, surprisingly large increases in notched Izod impact value are observed. At 10% PVDF, the impact resistance is high enough to remove 10% rubber modifier and still maintain good impact resistance (Example 141). Fixing the PVDF level at 10% in the formulation in Example 140, and substituting modifier A again shows that lower, but good notched Izod impact values are still obtained.

TABLE XVI

| Example No. | Imide Source (Example) | Imide Vicat (°C.)/ Type[1] | meq/g total acid | Mod.[2] Type | Ratio Imide/ PVDF/ Mod. (wt. %) | Notched Izod 23° C. 0° C. Joules/m | Tensile Impact Joules/ cm | GVHIT Joules/ cm (0.318-cm-thick plaque) | Tensile Prop. % Elong. @ Yield (break) | Tensile Prop. Modulus × 1000 kPa | DTUFL °C. @ 180 kPa (455 kPa) |
|---|---|---|---|---|---|---|---|---|---|---|---|
| 135+ | 64 | 170/UC | 0.624 | A | 60/00/40 | 106.5 / 38.4 | 17.4 | 22.8 | 8.6 (20) | 2220 | 134 (149) |
| 136 | 65 | 160/C | 0.002 | A | 60/00/40 | 53.4 / 22.4 | 25.2 | 25.3 | 5.4 (67) | 2503 | 116 (130) |
| 137+ | 64 | 170/UC | 0.624 | B | 60/00/40 | 64.6 | 10.5 | 9.38 | 6.5 | 2048 | 129 |

TABLE XVI-continued

| Example No. | Imide Source (Example) | Imide Vicat (°C.)/ Type[1] | meq/g total acid | Mod.[2] Type | Ratio Imide/ PVDF/ Mod. (wt. %) | Notched Izod 23° C. 0° C. Joules/m | Tensile Impact Joules/ cm | GVHIT Joules/ cm (0.318-cm-thick plaque) | Tensile Prop. % Elong. @ Yield (break) | Modulus × 1000 kPa | DTUFL °C. @ 180 kPa (455 kPa) |
|---|---|---|---|---|---|---|---|---|---|---|---|
| | | | | | | 36.3 | | | (16) | | (144) |
| 138 | 65 | 160/C | 0.002 | B | 60/00/40 | 206.7 | 29.4 | 26.2 | 6.0 | 2165 | 116 |
| | | | | | | 37.9 | | | (52) | | (132) |
| 139 | 65 | 160/C | 0.002 | B | 55/05/40 | 242.4 | 27.1 | 31.0 | 5.6 | 1896 | 105 |
| | | | | | | 61.9 | | | (75) | | (122) |
| 140 | 65 | 160/C | 0.002 | B | 50/10/40 | 331.1 | 32.4 | 31.5 | 5.1 | 1751 | 97 |
| | | | | | | 138.8 | | | (89) | | (113) |
| 141 | 65 | 160/C | 0.002 | B | 60/10/30 | 180.5 | 25.6 | 30.5 | 5.3 | 2179 | 107 |
| | | | | | | 38.4 | | | (88) | | (121) |
| 142+ | 64 | 170/UC | 0.624 | A | 50/10/40 | 185.3 | 21.0 | >18 | 8.6 | 1972 | 107 |
| | | | | | | 36.3 | | | (36) | | (127) |
| 143 | 65 | 160/C | 0.002 | A | 50/10/40 | 121.2 | 46.2 | 36.2 | 5.3 | 1862 | 101 |
| | | | | | | 46.5 | | | (31) | | (110) |

[1]Imides are all undried methyl imides. UC = unalkylated, C = alkylated.
[2]Modifier A = Butylacrylate (65%)//Styrene/Acrylonitrile (26/9%). Modifier B = Butylacrylate (65%)//Styrene/Acrylonitrile (30/5%).
+Comparative

EXAMPLES 144 TO 153

As noted by Kopchik (U.S. Pat. No. 4,255,322), methyl imides and polyvinyl chloride (PVC) resins are miscible over a relatively wide range. However, we have found that high imidization levels, high imide acid levels, and changes in the polyvinyl chloride resins can cause immiscibility in certain instances. Examples 144–153 illustrate that reducing the acid and anhydride functionality of the imide can correct such immiscibility. Example 144 shows a 50/50 imide/polyvinyl chloride blend (Geon® 103 PVC with a K value of 67) is only partially miscible, giving two sharply defined $T_g$ values, while the same blend, made with alkylated imide (Example 145), is completely miscible.

However, when these same imides are melt blended with a lower molecular weight PVC (Example 146) (Geon 85, K value=62), both alkylated (Example 147) and unalkylated (Example 146) imides are completely miscible with the PVC. Although the Geon 85 resin appears to be more miscible with imides at lower imidization levels, only partial miscibility is observed with this resin when imides having even higher imidization and acid levels are blended with the PVC resin as in Example 148. This example shows one very broad and uneven $T_g$ by DSC, indicating partial miscibility, whereas the same imide, when alkylated (Example 149), shows complete miscibility and one sharp $T_g$. The indices of refraction of the imides having 90% imidization or greater are close enough to the PVC refractive index so that appearance is not a conclusive factor.

Examples 150–153 show that the same enhanced miscibility seen with alkylated imides (Examples 144 and 145) is also seen in the two formulations given below, which represent typical polyvinyl chloride siding formulations for twin-screw extruder applications, and which are based on the less-miscible Geon 103 PVC. In the blends and siding formulations, we have also observed that the alkylated imide/PVC materials of the present invention show a better combination of properties than the unalkylated PVC/imide blends. A given, alkylated PVC/imide blend may show less color generation, a lower initial viscosity, a slower viscosity rise (as measured by torque in Brabender melt processing experiments), high impact resistance and heat distortion resistance.

| Component: | PVC Formulation I (PVC I) | PVC Formulation II (PVC II) |
|---|---|---|
| Geon 103 | 100.0 | 100.0 |
| MMA/EA proc. aid[1] | 0.5 | 1.0 |
| BA/S//S/MMA proc. aid[2] | 1.0 | 0.5 |
| Me—Tin stabilizer | 1.6 | 1.6 |
| Calcium stearate | 1.3 | 1.3 |
| Paraffin wax | 1.0 | 1.0 |
| TiO$_2$ | 10.0 | 10.0 |

[1]methyl methacrylate/ethyl acrylate
[2]butyl acrylate/styrene//styrene/methyl methacrylate
Results of these Examples are given in Table XVII.

TABLE XVII

| Example No. | Imide Source (Example) | Imide Vicat (°C.)/ Type[1] | Imide $T_g$ (°C.) DSC[2] | Imide % by wt.[3] | meq/g total acid[4] | Blended PVC Polymer/ Polymer $T_g$ | Imide/ Polymer Ratio | Observed $T_g$ (°C.) by DSC | Appearance[5] |
|---|---|---|---|---|---|---|---|---|---|
| 144+ | 62 | 167/UC | 164 | 81 | 0.513 | Geon 103/80 | 50/50 | 156/101 | OP/TL |
| 145 | 63 | 157/C | 158 | 84 | 0.011 | Geon 103/80 | 50/50 | 123 | CL[6] |
| 146+ | 62 | 167/UC | 164 | 81 | 0.513 | Geon 85/80 | 50/50 | 106 | CL[6] |
| 147 | 63 | 157/C | 158 | 84 | 0.011 | Geon 85/80 | 50/50 | 100 | CL |
| 148+ | 71 | 179/UC | 175 | 91 | 0.798 | Geon 85/80 | 50/50 | 115 | CL |
| 149 | 72 | 165/C | 163 | 90 | 0.002 | Geon 85/80 | 50/50 | 102 | CL |
| 150+ | 62 | 167/UC | 164 | 81 | 0.513 | PVC I | 50/50 | 158/96 | OP[7] |

TABLE XVII-continued

| Example No. | Imide Source (Example) | Imide Vicat (°C.)/ Type[1] | Imide $T_g$ (°C.) DSC[2] | Imide % by wt.[3] | meq/g total acid[4] | Blended PVC Polymer/ Polymer | Imide/ Polymer Ratio | Observed $T_g$ (°C.) by DSC | Appearance[5] |
|---|---|---|---|---|---|---|---|---|---|
| 151 | 63 | 157/C | 158 | 84 | 0.011 | PVC I | 50/50 | 119 | OP[7] |
| 152+ | 62 | 167/UC | 164 | 81 | 0.513 | PVC II | 50/50 | 156/98 | OP[7] |
| 153 | 63 | 157/C | 158 | 84 | 0.011 | PVC II | 50/50 | 116 | OP[7] |

[1]Imides are all undried methyl imides; UC = unalkylated, C = alkylated.
[2]Undried Imide.
[3]Imide weight % imidization level for methyl imides = 100 × (% N/8.377%).
[4]Milliequivalents of titratable acid in the imide per gram of sample (± ca. 0.020 meq/g titrated in MDC/MeOH - 1/1).
[5]OP = opaque; TL = translucent; TP = transparent; CL = clear.
[6]Appearance was clear with a trace of turbidity.
[7]PVC formulations I and II (see text) contain $TiO_2$, and are therefore opaque regardless of miscibility.
+Comparative

EXAMPLES 154 TO 207

The following examples illustrate polyimide blends having 90/10 and 10/90 weight ratios. These blends show that the enhancement of properties can occur for blends containing both small and large amounts of the imides having reduced acid and anhydride functionality. The imides used were prepared in the manner of Examples 52 and 56, respectively; the imide sample treated according to the present invention contained 7.18 weight percent nitrogen and had a weight-average molecular weight of 129,000, and the comparative imide without reduction of the acid and anhydride functionality contained 6.87 weight percent nitrogen and had a weight-average molecular weight of 145,000. Additional properties of the imides, the polymers used for blending, and the blends are given in Table XVIII.

TABLE XVIII

| Example No. | Imide Vicat (°C.)/ Type[1] | Imide $T_g$(°C.) by DSC[1] | Imide % by wt.[1] | meq/g total acid[1] | Blended Polymer[8] | Imide/ Polymer Ratio | Observed $T_g$(°C.) by DSC[1] | Appearance[2] |
|---|---|---|---|---|---|---|---|---|
| 154+ | 170/UC | 168 | 82.01 | 0.63 | — | 100/0 | 168 | CL |
| 155 | 160/C | 158 | 85.71 | 0.002 | — | 100/0 | 158 | CL |
|  |  |  |  |  | PVDF | 0/100 | CE[3] | OP/TL |
| 156+ | 170/UC | 168 | 82.01 | 0.63 | " | 90/10 | 158[3] | OP |
| 157 | 160/C | 158 | 85.71 | 0.002 | " | 90/10 | 146[3] | CL/H− |
| 158+ | 170/UC | 168 | 82.01 | 0.63 | " | 10/90 | 92[3] | OP |
| 159 | 160/C | 158 | 85.71 | 0.002 | " | 10/90 | 96 | TL |
|  |  |  |  |  | Sty/AN | 0/100 | 113 | CL |
| 160+ | 170/UC | 168 | 82.01 | 0.63 | " | 90/10 | 163/110 | CL/H |
| 161 | 160C | 158 | 85.71 | 0.002 | " | 90/10 | 152 | CL |
| 162+ | 170/UC | 168 | 82.01 | 0.63 | " | 10/90 | 169/115 | TL |
| 163 | 160/C | 158 | 85.71 | 0.002 | " | 10/90 | 114 | CL |
|  |  |  |  |  | PETG | 0/100 | CE[3] | CL |
| 164+ | 170/UC | 168 | 82.01 | 0.63 | " | 90/10 | 168/89 | CL/H− |
| 165 | 160/C | 158 | 85.71 | 0.002 | " | 90/10 | 158/90[3] | CL/H− |
| 166+ | 170/UC | 168 | 82.01 | 0.63 | " | 10/90 | 164/95[3] | TL/OP |
| 167 | 160/C | 158 | 85.71 | 0.002 | " | 10/90 | 156/96[3] | TL |
|  |  |  |  |  | PC | 0/100 | 152 | CL |
| 168+ | 170/UC | 168 | 82.01 | 0.63 |  | 90/10 | 163 | TL |
| 169 | 160C | 158 | 85.71 | 0.002 |  | 90/10 | 155 | CL/H− |
| 170+ | 170/UC | 168 | 82.01 | 0.63 |  | 10/90 | 169/148 | OP |
| 171 | 160/C | 158 | 85.71 | 0.002 |  | 10/90 | 149 | CL/H− |
|  |  |  |  |  | PET | 0/100 | 84[3] | OP/TL |
| 172+ | 170/UC | 168 | 82.01 | 0.63 |  | 90/10 | 155 | TL |
| 173 | 160/C | 158 | 85.71 | 0.002 |  | 90/10 | 158/77 | TL |
| 174+ | 170/UC | 168 | 82.01 | 0.63 |  | 10/90 | 161/87[3] | OP |
| 175 | 160/C | 158 | 85.71 | 0.63 |  | 10/90 | 154/85[3] | OP/H |
|  |  |  |  |  | PA | 0/100 | CE[3] | OP |
| 176+ | 170/UC | 168 | 82.01 | 0.63 |  | 90/10 | 153+ | TL/OP |
| 177 | 160/C | 158 | 85.71 | 0.002 |  | 90/10 | 153[4] | OP |
| 178+ | 170/UC | 168 | 82.01 | 0.63 |  | 10/90 | CE[4] | OP |
| 179 | 160/C | 158 | 85.71 | 0.63 |  | 10/90 | 152[4] | OP |
|  |  |  |  |  | PS | 0/100 | 191 | CL |
| 180+ | 170/UC | 168 | 82.01 | 0.63 |  | 90/10 | 166/189 | OP |
| 181 | 160/C | 158 | 85.71 | 0.002 |  | 90/10 | 159/181 | OP |
| 182+ | 170/UC | 168 | 82.01 | 0.63 |  | 10/90 | 164/187 | OP |
| 183 | 160/C | 158 | 85.71 | 0.002 |  | 10/90 | 158/188 | OP |
|  |  |  |  |  | Sty/MAH | 0/100 | 130 | CL |
| 184+ | 170/UC | 168 | 82.01 | 0.63 |  | 90/10 | 166/129 | TP |
| 185 | 160/C | 158 | 85.71 | 0.002 |  | 90/10 | 157[5] | CL/H− |
| 186+ | 170/UC | 168 | 82.01 | 0.63 |  | 10/90 | 164/133 | OP/H |
| 187 | 160C | 158 | 85.71 | 0.002 |  | 10/90 | 154/132 | OP/H |
|  |  |  |  |  | AN/MA/BD | 0/100 | — | TL |
| 188+ | 170/UC | 168 | 82.01 | 0.63 |  | 90/10 | 163/98 | TL |
| 189 | 160/C | 158 | 85.71 | 0.002 |  | 90/10 | 153/81 | TL |
| 190+ | 170/UC | 168 | 82.01 | 0.63 |  | 10/90 | 83[6] | TL |
| 191 | 160/C | 158 | 85.71 | 0.002 |  | 10/90 | 83[6] | TL |
|  |  |  |  |  | EVA | 0/100 | — | TL |

TABLE XVIII-continued

| | | | | | | | |
|---|---|---|---|---|---|---|---|
| 192+ | 170/UC | 168 | 82.01 | 0.63 | 90/10 | 168/CE[3] | OP |
| 193 | 160/C | 158 | 85.71 | 0.002 | 90/10 | 157/CE[3] | OP |
| 194+ | 170/UC | 168 | 82.01 | 0.63 | 10/90 | CE[3] | CL/H− |
| 195 | 160/C | 158 | 85.71 | 0.002 | 10/90 | 155/CE[3] | CL/H− |
| | | | | PVC | 0/100 | — | CL |
| 196+ | 170/UC | 168 | 82.01 | 0.63 | 90/10 | 161[7] | DEC |
| 197 | 160/C | 158 | 85.71 | 0.002 | 90/10 | 152 | TP |
| 198+ | 170/UC | 168 | 82.01 | 0.63 | 10/90 | 91[7] | DEC |
| 199 | 160/C | 158 | 85.71 | 0.002 | 10/90 | 102 | CL |
| | | | | Phenoxy | 0/100 | 102 | CL |
| 200+ | 170/UC | 168 | 82.01 | 0.63 | 90/10 | 163/112 | CL |
| 201 | 160/C | 158 | 85.71 | 0.002 | 90/10 | 152 | CL/H− |
| 202+ | 170/UC | 168 | 82.01 | 0.63 | 10/90 | 160/99 | TL/CL |
| 203 | 160/C | 158 | 85.71 | 0.002 | 10/90 | 99 | CL |
| | | | | Nylon 12 | 0/100 | — | TL |
| 204 | 170/C | 168 | 82.01 | 0.63 | 90/10 | 162/CE[4] | CL/TL |
| 205 | 160/C | 158 | 85.71 | 0.002 | 90/10 | 154/CE[4] | TL |
| 206+ | 170/UC | 168 | 82.01 | 0.63 | 10/90 | CE[4]/73 | TL |
| 207 | 160/C | 158 | 85.71 | 0.002 | 10/90 | CE[4]/70 | TL |

THE FOOTNOTES FOR TABLE NO. XVIII ARE AS FOLLOWS:
[1]As described for Table XVII. C = alkylated and UC = unalkylated.
[2]CL = Clear; TP = Transparent; TL = Translucent; OP = Opaque; DEC = Decomposed; H = Haze (H+ = Heavy Haze; H− = Slight Haze).
[3]Crystallization endotherm is observed in DSC.
[4]Crystallization endotherm obscures the $T_g$
[5]Appears as though two $T_g$'s are overlapping
[6]The Barex 210/Imide (90/10) blends degrade at a temp. on or around the $T_g$ of the Imide on the Brabender melt mixing device
[7]Considerable polymer degradation is observed in all the Geon 85/imide blends, i.e., considerable color formation is observed, but the alkylated imide/Geon 85 blends appear to be more stable.
[8]Polymers and sources:
PVDF - Polyvinylidene fluoride (Kynar 720 - Pennwalt Corp.)
Sty/AN - 75/25 Styrene/acrylonitrile copolymer (Tyril 1000 - Dow Chemical Co.)
PETG - Glycol modified polyethylene terephthalate (Kodar A-150 Eastman Kodak Co.)
PC - polycarbonate, $M_w$ 20,000 (M39, - Mobay, Inc.)
PET - Polyethylene terephthalate
PA - Polyacetal copolymer (M90 - Celanese Corp.)
PS - Polysulfone (Udel P1700 - Union Carbide Corp.)
Sty/MAH - Styrene/maleic anhydride copolmer (Dylark 332 Arco Chemical Co.)
AN/MA/BD - Acrylonitrile/methyl acrylate/butadiene (Barex 210 - Vistron Corp.)
EVA - Ethylene/vinyl acetate copolymer (Elvax 750 E. I. DuPont de Nemours & Co., Inc.)
PVC - Polyvinyl chloride (Geon 85 - BF Goodrich Co.)
Phenoxy - Epichlorohydrin-bisphenol A condensation polymer (PKHC - Union Carbide Corp.)
Nylon 12 - (Grilamid - Emser Industries)

EXAMPLES 208 TO 219

The following examples illustrate blends of polyimide copolymers with polystyrene (Sty) and polyphenylene oxide-high impact polystyrene blends (HIPS/PPO; Noryl®, General Electric). The polyimides having acid and anhydride functionality reduced according to the present invention were an imidized 90/10 methyl methacrylate/styrene (MMA/Sty) copolymer having a nitrogen content of 4.95 weight percent (Example 209), and an imidized, 73.5/24.5/2.0 methyl methacrylate/alpha-methylstyrene/ethyl acrylate (MMA/AMS/EA) terpolymer having a nitrogen content of 2.93 weight percent (Example 211). The corresponding polymers not having reduced acid and anhydride functionality (Examples 208 and 210) contained 4.90 and 3.08 weight percent nitrogen, respectively. Additional properties of the polyimides and blends are given in Table XIX.

TABLE XIX

| Example No. | Imide Source (Example) | Imide Vicat (°C.)/Type[1] | Imide $T_g$(°C.) by DSC[1] | Imide % by wt.[1] | meq/g total acid[1] | Blended Polymer | Blending Temperature | Observed $T_g$(°C.) by DSC[1] | Appearance[3] |
|---|---|---|---|---|---|---|---|---|---|
| 208+ | (2) | 150/UC | 148 | 77.8 | 0.620 | (MMA/Sty) | — | 148 | CL |
| 209 | (2) | 144/C | 142 | 78.57 | 0.018 | (MMA/Sty) | — | 142 | CL |
| 210+ | (2) | 162/UC | 160 | 58.0 | 0.736 | (MMA/AMS/EA) | — | 160 | CL |
| 211 | (2) | 150 | 147 | 55.49 | 0.030 | (MMA/AMS/EA) | — | 147 | CL |
| 212+ | 208 | 150/UC | 148 | 77.8 | 0.620 | Sty | 450° F. | 144/84 | TL |
| 213 | 209 | 144/C | 142 | 78.57 | 0.018 | Sty | 450° F. | 134/85 | TL |
| 214+ | 208 | 150/UC | 148 | 77.8 | 0.736 | HIPS/PPO | 450° F. | 144[4] | OP |
| 215 | 209 | 144/C | 142 | 78.57 | 0.030 | HIPS/PPO | 450° F. | 142[4] | OP |
| 216+ | 210 | 162/UC | 160 | 58.0 | 0.736 | Sty | 450° F. | 159/141/87 | TL |
| 217 | 211 | 150/C | 148 | 55.49 | 0.030 | Sty | 450° F. | 139/85 | TL |

TABLE XIX-continued

| Example No. | Imide Source (Example) | Imide Vicat (°C.)/ Type[1] | Imide $T_g$(°C.) by DSC[1] | Imide % by wt.[1] | meq/g total acid[1] | Blended Polymer | Blending Temperature | Observed $T_g$(°C.) by DSC[1] | Appearance[3] |
|---|---|---|---|---|---|---|---|---|---|
| 218+ | 210 | 162/UC | 160 | 58.0 | 0.736 | HIPS/PPO | 450° F. | 162/138[4] | OP |
| 219 | 211 | 150/C | 148 | 55.49 | 0.030 | HIPS/PPO | 450° F. | 145[4] | OP |

[1]As described for Table XVIII, C = alkylated; UC = unalkylated
[2]See text
[3]CL - Clear; TL = Translucent; OP = Clear
[4]Small enthalpic peak at 110° C. in DSC of Noryl blends is unidentified
+Comparative

EXAMPLES 220 TO 253

The following examples illustrate a series of 50/50 polyimide/thermoplastic blends that were prepared in a Brabender mixer at the temperature indicated in the accompanying Table; an air atmosphere was used. The polyimide used is the polymethylimide F (Example 63), having a Vicat value of 157° C., a $T_g$ of 158° C., 84% imidization, by weight, and a total acid and anhydride functionality of 0.011 meq/g, reduced according to the present invention. The properties of the blends are given in Table XX.

TABLE XX

| Example No. | Blended Polymer[5] | Blending Temperature | Observed $T_g$ by DSC (°C.) | Appearance |
|---|---|---|---|---|
| 220 | Polyarylate | 302° C. | 155/192 | OP |
| 221 | Polystyrene | 232° C. | 156/101 | OP |
| 222 | Polycarbonate (M50) | 246° C. | 155[2] | OP |
| 223 | Polysulfone | 316° C. | 155/187 | OP |
| 224 | Nylon 12 (Grilamid) | 232° C. | 45[3] | TL |
| 225 | Nylon 6 | 232° C. | 156/53[4] | TL |
| 226 | Nylon 11 | 249° C. | 153/51[4] | OP |
| 227 | Nylon 66 | 274° C. | 157/64[4] | OP |
| 228 | PETG (6763) | 221° C. | 153/80 | OP |
| 229 | Polybutylene terephthalate | 223° C. | 150/56[4] | OP |
| 230 | Polyethylene terephthalate | 254° C. | 153/86[4] | OP |
| 231 | Poly(methyl methacrylate) | 232° C. | 149/116 | OP |
| 232 | Styrene/acrylonitrile (75/25) | 450° C. | 130 | OP |
| 233 | Aromatic Nylon (Trogamid) | 260° C. | 153 | OP |
| 234 | PVC (Geon 85) | 199° C. | 100 | CL |
| 235 | PETG (Kodar A 150) | 216° C. | 149/95 | OP |
| 236 | ABS | 232° C. | 128 | TL |
| 237 | Polycarbonate (M39) | 246° C. | 152[2] | TL |
| 238 | Polyacetal (M90) | 210° C. | CE[3] | OP |
| 239 | Styrene/maleic anhydride | 232° C. | 153/131 | OP |
| 240 | Styrene/NH$_3$—Maleimide | 246° C. | 153 | CL/H— |
| 241 | Styrene/N—Methyl Maleimide | 246° C. | 154/133 | OP |
| 242 | alpha-Me Sty/Sty/AN copolymer | 246° | 138 | CL |
| 243 | Polyphenylenesulfide (PPS) | 302° C. | 158/110 | OP |
| 244 | Polyetherimide | 327° C. | 158/219 | OP |
| 245 | MA/AN/BD | 199° C. | 142/82 | TL |
| 246 | Phenoxy | 193° C. | 118 | TL |
| 247 | Poly(ethylene/8% acrylic acid) | 193° C. | 158[4] | OP |
| 248 | Polyvinylidene fluoride | 246° C. | 78 | CL |
| 249 | Chlorinated polyvinyl chloride | 199° C. | 149 | OP/DEC |
| 250 | Polyethylene | 199° C. | 156[4] | TL/CL |
| 251 | Polypropylene | 204° C. | CE[4] | OP |
| 252 | Ethylene/vinyl acetate | 193° C. | 156[4] | OP |
| 253 | Polyvinylidene chloride | 193° C. | 99 | TL/CL |

[1]OP - opaque, TL = translucent; CL = clear; H = haze (− is slight); DEC = decomposition.
[2]Polycarbonate $T_g$ overlaps imide $T_g$.
[3]Crystallization endotherm obscures imide $T_g$.
[4]Crystallization endotherm observed in DSC.
[5]Polymers and Sources:
Polyarylate is Ardel D-100 (Union Carbide Corp.)
Polystyrene is PS 656D (Dow Chemical Co.)
Polycarbonate M39 is $M_w$ 20,000 (Mobay Inc.)
Polycarbonate M50 is $M_w$ 24,600 (Mobay Inc.)
Polysulfone is UDEL P1700 (Union Carbide Corp.)
Nylon 12 is Grilamid (Emser Industries)

TABLE XX-continued

Nylon 11 is BMNO (Rilsan Corp.)
Nylon 66 is Zytel 101 (E. I. duPont de Nemours & Co.)
Nylon 6 is Fosta 446 (American Hoechst Corp.)
PETG 6763 is Glycol modified polyethylene terephthalate
(Eastman Kodak Co.)
Polybutylene terephthalate is Celanax 2002 (Celanese Corp.)
Aromatic Nylon is Trogamid T (Kay-Fries Co.)
PVC is polyvinyl chloride Geon 85 (BF Goodrich Co.)
PETG Kodar A-150 is glycol-modified polyethylene terephthalate
(Eastman Kodak Co.)
ABS is butadiene//acrylonitrile/styrene Abson 89140 (Mobay Inc.)
Polyacetal M90 is a product of Celanese Corp.
Polyvinylidene chloride is Experimental PVDC Resin XU-32009.00
(Dow Chemical Co.)
Other polymer descriptions may be found in the footnotes to
Table XVIII.

EXAMPLE 254

In a manner similar to that of Examples 242-253, a 50/50 blend of the polyimide from Example 20 with alpha-methylstyrene/acrylonitrile copolymer was prepared at 246° C.; the resulting clear blend had a single $T_g$ of 138° C.

EXAMPLE 255

In a manner similar to that of Example 233 a 50/50 blend of polyimide (having a Vicat value of 160° C., a $T_g$ of 158° C.; 82% imidization and 0.002 meq/g total acid and anhydride functionality, reduced according to the present invention) with Noryl ® (polyphenylene oxide-high impact polystyrene blend) was prepared. The resulting opaque blend showed $T_g$ values at 158° C. and 138° C.

In a manner similar to the above examples, copolymers of styrene and maleimide, containing residual maleic anhydride functionality, such as Dylark ® DKB-162, in which approximately 14% of the anhydride functionality remains (see U.S. Pat. No. 4,458,046—Example 1), may be treated to decrease or substantially eliminate the anhydride functionality using the conditions of Examples 7 and 30.

Polymeric imides resulting from condensation of dianhydrides and diamines, including the generic class of polyimides referred to as polyetherimides, which contain residual acid functionality, may also be reacted with the agents disclosed above, using the conditions of Examples 7 and 30, where the extrusion temperature is about 350°-400° C., to give polyimides with reduced levels of acid functionality.

Further, polymeric imides resulting from copolymerization of maleimides with other vinyl monomers, such as copolymers of maleimide or N-phenyl maleimide and styrene and/or MMA, in which partial hydrolysis has occured to give maleamic acids, diacids, or anhydrides, may be treated with the agents disclosed above, using the conditions in Examples 7 or 30, to give decreased levels of acid and anhydride functionality.

Adhesion-enhanced impact resistance is expected in blends of polycarbonates with impact modifiers, and the imides of the present invention; such blends using untreated imides are disclosed by Mueller (U.S. Pat. No. 4,254,232). Improved miscibility leads to better bonding, and thus to improved impact resistance.

In general, all imides disclosed in U.S. Pat. No. 4,246,374, hereby incorporated by reference, especially those polymeric imides containing up to 20% of the lower alkyl acrylates, which contain any residual acid or anhydride functionality, may be effectively treated by the methods disclosed above, such as the method described in Examples 7 and 30, to give polymeric imides with reduced or substantially eliminated acid functionality.

We claim:

1. A process for altering the properties of a polymer containing imide units of the structural formula

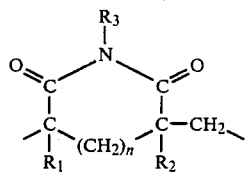

wherein $R_1$, $R_2$ and $R_3$ are independently selected from among hydrogen and substituted or unsubstituted, $C_1$ to $C_{20}$ alkyl, aryl, alkaryl or aralkyl, or mixtures thereof, wherein any substituents present are selected from the group consisting of methyl, ethyl, hydroxyl, methoxy, ethoxy, halo, carboxyl and ethylcarbonyl, wherein n is 0-1, and wherein the degree of imidization is at least 1% and said polymer contains residual acidic and anhydride groups, which process comprises reacting said residual groups with an agent capable of converting said acid and anhydride groups to non-acid or non-anhydride groups and incapable of reacting with said imide units, said agent being selected from the group consisting of alkylating agents and esterification agents.

2. A process according to claim 1 wherein said agent is an orthoester.

3. A process according to claim 1 wherein said agent is a ketal.

4. A process according to claim 1 wherein said agent is an alkyl, aryl, alkaryl or aralkyl carbonate.

5. A process according to claim 1 wherein said agent is a dialkyl sulfoxide.

6. A process according to claim 1 wherein said reaction is conducted at a temperature of from about 50° C. to about 400° C.

7. A process according to claim 1 wherein said reaction is conducted at a pressure of from about atmospheric to about 150 atmospheres.

8. A process according to claim 1 wherein said agent is used in about a stoichiometric amount necessary to react with the undesired amount of residual acidic or residual anhydride groups.

9. A process according to claim 1 wherein said agent is used in an amount of from about 10% to about 50% in excess of the stoichiometric amount necessary to react with the residual acidic or residual anhydride groups.

10. A process according to claim 1 wherein said agent is trimethyl orthoformate.

11. A process according to claim 1 wherein said agent is triethyl orthoformate.

12. A process according to claim 1 wherein said agent is dimethyl carbonate.

13. A process according to claim 1 wherein said agent is dimethyl sulfoxide.

14. A process according to claim 1 wherein said agent is 2,2-dimethoxypropane.

15. A process according to claim 1 wherein said reaction is conducted in a screw extruder having at least one screw mixing element disposed therein.

16. A process according to claim 1 wherein said reaction is conducted in a melt mixing device.

17. A process according to claim 1 wherein said polymer is a polyglutarimide.

18. A process according to claim 1 wherein said polymer is a polyglutarimide having a degree of imidization of up to about 99%.

19. A process according to claim 1 wherein said polymer is a polyglutarimide having a degree of imidization of from about 10% to about 95%.

20. A process according to claim 1 wherein said polymer is a polyglutarimide wherein said imide units are derived from methylamine.

21. A process according to claim 1 wherein said polymer is a polyglutarimide wherein said imide units are derived from ammonia.

22. The process according to claim 20 wherein said agent is dimethyl carbonate.

* * * * *